US012159636B2

(12) United States Patent
Nagel et al.

(10) Patent No.: US 12,159,636 B2
(45) Date of Patent: *Dec. 3, 2024

(54) APPARATUS, METHOD AND COMPUTER PROGRAM FOR GENERATING A REPRESENTATION OF A BANDWIDTH-EXTENDED SIGNAL ON THE BASIS OF AN INPUT SIGNAL REPRESENTATION USING A COMBINATION OF A HARMONIC BANDWIDTH-EXTENSION AND A NON-HARMONIC BANDWIDTH-EXTENSION

(71) Applicant: Fraunhofer-Gesellschaft zur Foerderung der angewandten Forschung e.V., Munich (DE)

(72) Inventors: Frederik Nagel, Nuremberg (DE); Max Neuendorf, Nuremberg (DE); Nikolaus Rettelbach, Nuremberg (DE); Jérémie Lecomte, Fuerth (DE); Markus Multrus, Nuremberg (DE); Bernhard Grill, Lauf (DE); Sascha Disch, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 32 days.

This patent is subject to a terminal disclaimer.

(21) Appl. No.: 17/145,047

(22) Filed: Jan. 8, 2021

(65) Prior Publication Data

US 2021/0134303 A1 May 6, 2021

Related U.S. Application Data

(63) Continuation of application No. 16/712,903, filed on Dec. 12, 2019, now Pat. No. 10,909,994, which is a (Continued)

(30) Foreign Application Priority Data

Dec. 30, 2009 (EP) .................................... 09181008

(51) Int. Cl.
*G10L 19/008* (2013.01)
*G10L 19/02* (2013.01)
(Continued)

(52) U.S. Cl.
CPC ............ *G10L 19/008* (2013.01); *G10L 19/18* (2013.01); *G10L 21/038* (2013.01); *G10L 19/02* (2013.01)

(58) Field of Classification Search
CPC ..... G10L 19/02; G10L 21/0388; G10L 19/16; G10L 19/18; G10L 19/008; G10L 21/038
See application file for complete search history.

(56) References Cited

U.S. PATENT DOCUMENTS 5,127,054 A 6/1992 Hong et al.
5,950,153 A 9/1999 Ohmori et al.
(Continued)

FOREIGN PATENT DOCUMENTS

AU 2003243441 A1 12/2003
EP -1367566 12/2003
(Continued)

OTHER PUBLICATIONS

"Information technology—Coding of moving pictures and associated audio for digital storage media at up to about 1,5 Mbit/s—Part 3: Audio", ISO/IEC 11172-3 First Edition, Aug. 1, 1993, 158 pages.
(Continued)

*Primary Examiner* — Angela A Armstrong
(74) *Attorney, Agent, or Firm* — Perkins Coie LLP; Michael A. Glenn

(57) ABSTRACT

An apparatus for generating a representation of a bandwidth-extended signal on the basis of an input signal representation
(Continued)

includes a phase vocoder configured to obtain values of a spectral domain representation of a first patch of the bandwidth-extended signal on the basis of the input signal representation. The apparatus also includes a value copier configured to copy a set of values of the spectral domain representation of the first patch, which values are provided by the phase vocoder, to obtain a set of values of a spectral domain representation of a second patch, wherein the second patch is associated with higher frequencies than the first patch. The apparatus is configured to obtain the representation of the bandwidth-extended signal using the values of the spectral domain representation of the first patch and the values of the spectral domain representation of the second patch.

21 Claims, 9 Drawing Sheets

Related U.S. Application Data continuation of application No. 15/611,422, filed on Jun. 1, 2017, now Pat. No. 10,522,156, which is a continuation of application No. 12/992,051, filed as application No. PCT/EP2010/054422 on Apr. 1, 2010, now Pat. No. 9,697,838.

(60) Provisional application No. 61/166,125, filed on Apr. 2, 2009, provisional application No. 61/168,068, filed on Apr. 9, 2009.

(51) Int. Cl.
*G10L 19/18* (2013.01)
*G10L 21/038* (2013.01)

(56) References Cited

U.S. PATENT DOCUMENTS

| | | | |
|---|---|---|---|
| 6,138,093 | A | 10/2000 | Ekudden et al. |
| 6,549,884 | B1 | 4/2003 | Laroche et al. |
| 6,708,145 | B1 | 3/2004 | Liljeryd et al. |
| 6,895,375 | B2 | 5/2005 | Malah et al. |
| 7,139,702 | B2 | 11/2006 | Tsushima et al. |
| 7,260,520 | B2 | 8/2007 | Henn et al. |
| 7,308,401 | B2 | 12/2007 | Tsushima et al. |
| 7,509,254 | B2 | 3/2009 | Tsushima et al. |
| 7,742,927 | B2 | 6/2010 | Philippe et al. |
| 7,783,496 | B2 | 8/2010 | Tsushima et al. |
| 7,864,843 | B2 | 1/2011 | Choo et al. |
| 8,112,284 | B2 | 2/2012 | Kjoerling et al. |
| 8,781,844 | B2 | 7/2014 | Laaksonen et al. |
| 8,788,276 | B2 | 7/2014 | Neuendorf et al. |
| 8,818,541 | B2 | 8/2014 | Villemoes et al. |
| 8,880,410 | B2 | 11/2014 | Nagel et al. |
| 9,076,433 | B2 * | 7/2015 | Nagel ..................... G10L 19/18 |
| 9,697,838 | B2 * | 7/2017 | Nagel ................... G10L 21/038 |
| 10,522,156 | B2 * | 12/2019 | Nagel ..................... G10L 19/18 |
| 10,909,994 | B2 * | 2/2021 | Nagel ................... G10L 19/008 |
| 2002/0016698 | A1 | 2/2002 | Tokuda |
| 2002/0118845 | A1 | 8/2002 | Henn et al. |
| 2004/0028244 | A1 | 2/2004 | Tsushima et al. |
| 2004/0078205 | A1 | 4/2004 | Liljeryd et al. |
| 2004/0125878 | A1 | 7/2004 | Liljeryd et al. |
| 2004/0138876 | A1 | 7/2004 | Kallio et al. |
| 2004/0174911 | A1 | 9/2004 | Kim et al. |
| 2005/0096917 | A1 | 5/2005 | Kjorling et al. |
| 2005/0246164 | A1 | 11/2005 | Ojala et al. |
| 2006/0267825 | A1 | 11/2006 | Fujiyama et al. |
| 2007/0238415 | A1 | 10/2007 | Sinha et al. |
| 2007/0282599 | A1 | 12/2007 | Choo et al. |
| 2008/0120116 | A1 | 5/2008 | Schnell et al. |
| 2009/0041111 | A1 | 2/2009 | Liljeryd et al. |
| 2009/0107322 | A1 | 4/2009 | Akiyama |
| 2009/0319259 | A1 | 12/2009 | Liljeryd et al. |
| 2009/0319280 | A1 | 12/2009 | Liljeryd et al. |
| 2010/0114583 | A1 | 5/2010 | Lee et al. |
| 2010/0250261 | A1 | 9/2010 | Laaksonen et al. |
| 2010/0274555 | A1 | 10/2010 | Laaksonen et al. |
| 2010/0280834 | A1 | 11/2010 | Tsushima et al. |
| 2010/0292994 | A1 | 11/2010 | Lee et al. |
| 2011/0019838 | A1 | 1/2011 | Kaulberg et al. |
| 2011/0173006 | A1 | 7/2011 | Nagel et al. |
| 2011/0264457 | A1 | 10/2011 | Oshikiri et al. |
| 2012/0275607 | A1 | 11/2012 | Kjoerling et al. |
| 2012/0328121 | A1 | 12/2012 | Truman et al. |

FOREIGN PATENT DOCUMENTS

| | | | |
|---|---|---|---|
| EP | -1300833 | | 11/2006 |
| EP | 1970900 | A1 | 9/2008 |
| JP | 2002082685 | A | 3/2002 |
| JP | -2003216190 | | 7/2003 |
| JP | 2004517358 | A | 6/2004 |
| JP | -2005521907 | | 7/2005 |
| JP | -2005530206 | | 10/2005 |
| RU | 2199157 | C2 | 2/2003 |
| RU | 2007116941 | A | 11/2008 |
| WO | 9857436 | A2 | 12/1998 |
| WO | -0182289 | | 11/2001 |
| WO | -02/052545 | | 7/2002 |
| WO | -02/056301 | | 7/2002 |
| WO | -03/107329 | | 12/2003 |

OTHER PUBLICATIONS

Aarts , et al., “A Unified Approach to Low- and High-Frequency Bandwidth Extension”, AES Convention Paper 5921, Presented at the 115th Convention, New York, USA, Oct. 2003, 16 pages.

Brinker, Den , et al., “An overview of the coding standard MPEG-4 Audio Amendments 1 and 2: HE-AAC, SSC and HE-AAC v2”, 2009, In EURASIP J. Audio, Speech, Music Process., vol. 2009, pp. 1-24.

Dietz, Martin , et al., “Spectral Band Replication, a Novel Approach in Audio Coding”, Engineering Society Convention 121, Audio Engineering Society Paper 5553, pp. 1-8.

Hsu, H , et al., “Audio Patch Method in MPEG-4 HE-AAC Decoder”, Presented at the 117th AES Convention. San Francisco, CA, USA., 1-11.

Iyengar, V , et al., “International Standard ISO/IEC 14496-3:2001/FPDAM 1: Bandwidth Extension”, Speech Bandwidth Extension Method and Apparatus, 405 pages.

Kayhko , “A Robust Wideband Enhancement for Narrowband Speech Signal”, Research Report, Helsinki Univ. of Technology, Laboratory of Acoustics and Audio Signal Processing, 75 Pages, 2001, cited in Kallio, Laura, “Artificial Bandwidth Expansion of Narrowband Speech in Mobile Communications Systems”, Master's ThesisHelsinki Univ. of Technology, p. 65, Dec. 9, 2002.

Kayhko, K. , “A Robust Wideband Enhancement for Narrowband Speech Signal”, Kayhko, “A Robust Wideband Enhancement for Narrowband Speech Signal”, Research Report, Helsinki Univ. of Technology, Laboratory of Acoustics and Audio Signal Processing, 75 Pages, 2001, cited in Kallio, Laura, Artificial Bandwidth Expansion of Narrowband, 69 pages.

Larsen , et al., “Audio Bandwidth Extension”, Chapters 5, 6 and 8; ISBN 0-470-85864-8, copyright 2004, John Wiley & Sons, 2004, 55 pages.

Larsen , et al., “Efficient high-frequency bandwidth extension of music and speech”, AES Convention Paper 5627, Presented at the 112th Convention, Munich, Germany, May 2002, 5 pages.

Makhoul , et al., “Spectral Analysis of Speech by Linear Prediction”, IEEE Transactions on Audio and Electroacoustics, Jun. 1973, pp. 140-148.

Meltzer, S , et al., “SBR enhanced audio codecs for digital broadcasting such as “Digital Radio Mondiale” (DRM)”, AES 112th Convention. Munich, Germany, 4 pages.

(56) References Cited

OTHER PUBLICATIONS

Nagel , et al., "A harmonic bandwidth extension method for audio codecs", ICASSP, IEEE Int'l Conference on Acoustics, Speech and Signal Processing, Taipei, Taiwan, Apr. 2009, 4 pages.
Pulakka , et al., "Evaluation of an Artificial Speech Bandwidth Extension Method in Three Languages", IEEE Transactions on Audio, Speech and Language Processing, vol. 16, No. 6, Aug. 2008, pp. 1124-1137.
Pulakka , et al., "The Effect of Highband Harmonic Structure in the Artificial Bandwidth Expansion of Telephone Speech", Interspeech 2007, Antwerp, Belgium, Aug. 2007, pp. 2497-2500.
Qian , et al., "Combining Equalization and Estimatikon for Bandwidth Extension of Narrowband Speech", ICASSP 2004, 2004, 4 pages.
Schnell , et al., "Enhanced MPEG-4 Low Delay AAC—Low Bitrate High Quality Communication", Presented at the 122nd Convention, Audio Engineering Society, Convention Paper 6998, Vienna, Austria, May 2007, 13 pages.
Ziegler , et al., "Enhancing mp3 with SBR: Features and Capabilities of the new mp3PRO Algorithm", AES Convention Paper 5560, Presented at the 112th Convention, Munich, Germany, May 2002, 7 pages.

* cited by examiner

| FIG 5A | FIG 5B |
|---|---|

Embodiment Algorithm
(HBE in frequency domain)

APPARATUS, METHOD AND COMPUTER PROGRAM FOR GENERATING A REPRESENTATION OF A BANDWIDTH-EXTENDED SIGNAL ON THE BASIS OF AN INPUT SIGNAL REPRESENTATION USING A COMBINATION OF A HARMONIC BANDWIDTH-EXTENSION AND A NON-HARMONIC BANDWIDTH-EXTENSION

CROSS-REFERENCE TO RELATED APPLICATIONS

This application is a continuation of U.S. patent application Ser. No. 16/712,903, filed Dec. 12, 2019, which in turn is a continuation of copending U.S. patent application Ser. No. 15/611,422, filed Jun. 1, 2017, which in turn is a continuation of copending U.S. patent application Ser. No. 12/992,051, filed Jun. 23, 2011, which in turn is a continuation of copending International Application No. PCT/EP2010/054422, filed Apr. 1, 2010, which are all incorporated herein by reference in their entirety, and additionally claims priority from U.S. Application No. 61/166,125, filed Apr. 2, 2009, and from U.S. Application No. 61/168,068, filed Apr. 9, 2009, and from European Application No. EP 09181008.5, filed Dec. 30, 2009, and which are also incorporated herein by reference in their entirety.

Embodiments according to the invention are related to an apparatus for generating a representation of a bandwidth-extended signal on the basis of an input signal representation. Other embodiments according to the invention are related to a method for generating a representation of a bandwidth-extended signal on the basis of an input signal representation. Further embodiments according to the invention are related to a computer program for performing such method.

Some embodiments according to the invention are related to novel patching methods inside spectral band replication.

BACKGROUND OF THE INVENTION

Storage or transmission of audio signals is often subject to strict bitrate constraints. These constraints are usually overcome by a coding of the signal. In the past, coders were forced to drastically reduce the transmitted audio bandwidth when only a very low bitrate was available. Modern audio codecs are nowadays able to preserve the audible bandwidth by using bandwidth extension (BWE) methods. Such methods are described, for example, in references [1] to [12]. These algorithms rely on a parametric representation of the high-frequency content (HF), which is generated from the waveform-coded low-frequency part (LF) of the decoded signal by means of transposition into the HF spectral region ("patching") and the application of a parameter driven post processing.

In the art, methods of bandwidth extension, such as spectral band replication (SBR) are used as an efficient method to generate high-frequency signals in HFR (high-frequency reconstruction) based codecs.

The spectral band replication described in reference [1], which is also briefly designated as "SBR", uses a quadrature mirror filterbank (QMF) for generating the HF information. With the help of the so-called "patching" process, lower QMF-bands are copied to higher (frequency) position yielding in a replication of the information of the LF part in the HF part. The generated HF is afterwards adapted to the original HF part with the help of parameters that adopt (or adjust) the spectral envelope and the tonality (for example using an envelope formatting).

In standard SBR, patching is carried out by a copy operation inside the QMF-domain. It has been found that this can sometimes lead to auditory artifacts, particularly if sinusoids are copied into the vicinity of each other at the border of LF and the generated HF part. Thus, it can be stated that the standard SBR has the problem of auditory artifacts. Also, some conventional implementations of bandwidth extension concept bring along a comparatively high complexity. Additionally, in some invention implementations of bandwidth extension concepts, the spectrum becomes very sparse for high patches (high stretching factors), which may result in undesired (audible) audio artifacts.

In view of the above discussion, it is an objective of the present invention to create a concept for generating a representation of a bandwidth-extended signal on the basis of an input signal representation, which brings along an improved tradeoff between complexity and audio quality.

SUMMARY

According to an embodiment, an apparatus for generating a representation of a bandwidth-extended signal on the basis of an input signal representation may have: a phase vocoder configured to acquire values of a spectral domain representation of a first patch of the bandwidth-extended signal on the basis of the input signal representation; and a value copier configured to copy a set of values of the spectral domain representation of the first patch, which values are provided by the phase vocoder, to acquire a set of values of a spectral domain representation of a second patch, wherein the second patch is associated with higher frequencies than the first patch; wherein the apparatus is configured to acquire the representation of the bandwidth-extended signal using the values of the spectral domain representation of the first patch and the values of the spectral domain representation of the second patch.

According to another embodiment, an audio decoder may have: an apparatus for generating a representation of a bandwidth-extended signal on the basis of an input signal representation, which apparatus may have: a phase vocoder configured to acquire values of a spectral domain representation of a first patch of the bandwidth-extended signal on the basis of the input signal representation; and a value copier configured to copy a set of values of the spectral domain representation of the first patch, which values are provided by the phase vocoder, to acquire a set of values of a spectral domain representation of a second patch, wherein the second patch is associated with higher frequencies than the first patch; wherein the apparatus is configured to acquire the representation of the bandwidth-extended signal using the values of the spectral domain representation of the first patch and the values of the spectral domain representation of the second patch.

According to another embodiment, a method for generating a representation of a bandwidth-extended signal on the basis of an input signal representation may have the steps of: acquiring, using a phase vocoding, values of a spectral-domain representation of a first patch of the bandwidth-extended signal on the basis of the input signal representation; and copying a set of values of the spectral-domain representation of the first patch, which values are provided by the phase vocoding, to acquire a set of values of a spectral-domain representation of a second patch, wherein the second patch is associated with higher frequencies than the first patch; and acquiring the representation of the bandwidth-extended signal using the values of the spectral-domain representation of the first patch and the values of the spectral-domain representation of the second patch.

According to another embodiment, an apparatus for generating a representation of a bandwidth-extended signal on the basis of an input signal representation may have: a value copier configured to copy a set of values of the input signal representation, to acquire a set of values of a spectral domain representation of a first patch, wherein the first patch is associated with higher frequencies than the input signal representation; and a phase vocoder configured to acquire values of a spectral domain representation of a second patch of the bandwidth-extended signal on the basis of the values of the spectral domain representation of the first patch, wherein the second patch is associated with higher frequencies than the first patch; and wherein the apparatus is configured to acquire the representation of the bandwidth-extended signal using the values of the spectral domain representation of the first patch and the values of the spectral domain representation of the second patch.

According to another embodiment, a method for generating a representation of a bandwidth-extended signal on the basis of an input signal representation may have the steps of: copying values of the input signal representation, to acquire values of a spectral-domain representation of a first patch of the bandwidth-extended signal on the basis of the input signal representation, wherein the first patch is associated with higher frequencies than the input signal representation; and acquiring, using a phase vocoding, a set of values of the spectral-domain representation of the second patch on the basis of a set of values of the spectral-domain representation of the first patch, which values of the spectral domain representation of the first patch are acquired by the copying, wherein the second patch is associated with higher frequencies than the first patch; and acquiring the representation of the bandwidth-extended signal using the values of the spectral-domain representation of the first patch and the values of the spectral-domain representation of the second patch.

According to another embodiment, a computer program for performing the method for generating a representation of a bandwidth-extended signal on the basis of an input signal representation, which method may have the steps of: acquiring, using a phase vocoding, values of a spectral-domain representation of a first patch of the bandwidth-extended signal on the basis of the input signal representation; and copying a set of values of the spectral-domain representation of the first patch, which values are provided by the phase vocoding, to acquire a set of values of a spectral-domain representation of a second patch, wherein the second patch is associated with higher frequencies than the first patch; and acquiring the representation of the bandwidth-extended signal using the values of the spectral-domain representation of the first patch and the values of the spectral-domain representation of the second patch, when the computer program runs on a computer.

According to another embodiment, a computer program for performing the method for generating a representation of a bandwidth-extended signal on the basis of an input signal representation, which method may have the steps of: copying values of the input signal representation, to acquire values of a spectral-domain representation of a first patch of the bandwidth-extended signal on the basis of the input signal representation, wherein the first patch is associated with higher frequencies than the input signal representation; and acquiring, using a phase vocoding, a set of values of the spectral-domain representation of the second patch on the basis of a set of values of the spectral-domain representation of the first patch, which values of the spectral domain representation of the first patch are acquired by the copying, wherein the second patch is associated with higher frequencies than the first patch; and acquiring the representation of the bandwidth-extended signal using the values of the spectral-domain representation of the first patch and the values of the spectral-domain representation of the second patch, when the computer program runs on a computer.

It is the key idea of the present invention that a particularly good tradeoff between computational complexity and audio quality of a bandwidth-extended signal is obtained by combining a phase vocoder with a value copier, such that the first patch of the bandwidth-extended signal is obtained by the phase vocoder, and such that the second patch of the bandwidth-extended signal is obtained on the basis of the first patch using the value copier. Accordingly, the content of the first patch is a harmonically transposed version of the content of the low-frequency part (LF) of the input signal (represented by the input signal representation), and the second patch is (or represents) a (non-harmonically) frequency-shifted version of the signal content of the first patch. Accordingly, the second patch can be obtained with relatively low computational complexity because the copying of the values is computationally simpler than a phase vocoding operation. Also, it is avoided that there are large spectral holes in the second patch, because the spectral values of the first patch are typically populated (i.e. comprise non-zero values) sufficiently, such that audible artifacts, which would be caused, in some cases, if the second patch was only sparsely populated, are reduced or avoided.

To summarize, the inventive concept brings along significant advantages over conventional patching methods, because the harmonic bandwidth-extension, using the phase vocoder, is applied only for obtaining values of the spectral-domain representation of the first patch, i.e. for the lower part of the spectrum, while a non-harmonic bandwidth extension, which relies on a copying of values of the spectral-domain representation of the first patch to obtain values of the spectral-domain representation of the first patch, is used for higher frequencies. Accordingly, the lower range (which is also designated as "first patch") of the extension-frequency portion (which is a frequency portion above the crossover frequency) is provided as a harmonic extension of the fundamental frequency range (i.e. in the frequency range of the input signal, which covers frequencies lower than the frequencies of the extension frequency portion, for example frequencies below the crossover frequency), which brings along a good hearing impression of the bandwidth-extended signal. Also, it has been found that the simple generation of the values of the spectral domain representation of the higher range of the extension-frequency portion (which is also designated as "second patch"), which is performed using the copier, does not bring along significant auditory artifacts because the human hearing is not particularly sensitive to spectral details of the higher range of the extension-frequency portion (second patch).

To summarize, the inventive concept brings along a good hearing impression at a comparatively small computational complexity.

In an advantageous embodiment the phase vocoder is configured to copy a set of magnitude values associated with a plurality of given frequency subranges of the input spectral representation, to obtain a set of magnitude values associated with corresponding frequency subranges of the first patch, wherein a pair of a given frequency subrange of the input spectral representation and a corresponding frequency subrange of the first patch covers (or comprises) a pair of a fundamental frequency and a harmonic of the fundamental frequency (for example a first harmonic of the fundamental frequency). The phase vocoder is also Advantageously configured to multiply phase values associated with the plurality of given frequency subranges of the input spectral representation with a predetermined factor (for example 2), to obtain phase values associated with corresponding frequency subranges of the first patch. Advantageously, the value copier is configured to copy a set of values associated with a plurality of given frequency subranges of the first patch, to obtain a set of values associated with corresponding frequency subranges of the second patch. The value copier is Advantageously configured to leave phase values unchanged in the copying. Accordingly, the phase vocoder performs, at least approximately, a harmonic transposition, while the value copier performs a non-harmonic frequency shift. The frequency subranges may for example be frequency ranges associated with coefficients of a Fast Fourier Transform (or any comparable transform). Alternatively, the frequency subranges may be frequency ranges associated with individual signals of a QMF filterbank. Typically, a width of the frequency subranges is comparatively small compared to the center frequency, such that frequency subranges cover a frequency span having a frequency ratio between an end frequency and a starting frequency, which is significantly smaller than 2:1. In other words, even though the frequency subranges of the input spectral representation (which may, for example, take the form FFT coefficients, or the form of QMF filterbank signals) and the frequency subranges of the first patch do not need to be exactly harmonic with respect to each other, it is typically possible to identify an association between a frequency subrange (e.g., having frequency index k) of the input spectral representation and a corresponding frequency subrange (e.g., having frequency index 2k) of the first patch, such that the frequency subrange (2k) of the first patch represents, at least approximately, a harmonic frequency of the corresponding frequency subrange (k) of the input spectral representation.

Accordingly, a harmonic transposition is performed by the phase vocoder, taking into account the phase values, which are processed using a phase scaling. In contrast, the value copier merely performs (at least approximately), a non-harmonic frequency-shift operation.

In an advantageous embodiment, the value copier is configured to copy the values such that a common spectral shift (or frequency shift) of values of the first patch onto values of the second patch is obtained.

In an advantageous embodiment, the phase vocoder is configured to obtain the values of the spectral-domain representation of the first patch such that the values of the spectral-domain representation of the first patch represent a harmonically upconverted version of a fundamental frequency range of the input signal representation (for example, a fundamental frequency range below a so-called crossover frequency). The value copier is Advantageously configured to obtain the values of the spectral-domain representation of the second patch such that the values of the spectral-domain representation of the second patch represent a frequency-shifted version of the first patch. Accordingly, the above described advantages are obtained. In particular, the implementation is simple while obtaining a good auditory impression.

In an advantageous embodiment, the apparatus is configured to receive pulse-code-modulated (PCM) input audio data, to down-sample the pulse-code-modulated input audio data in order to obtain down-sampled pulse-code-modulated audio data. Also, the apparatus is configured to window the down-sampled pulse-code-modulated audio data, in order to obtain windowed input data, and to convert or transform the windowed input data into a frequency-domain, in order to obtain the input signal representation. The apparatus is also Advantageously configured to compute magnitude values $a_k$ (also designated with $\alpha_k$) and phase values $\varphi_k$, representing a frequency bin k (wherein k is a frequency bin index) of the input signal representation, and to copy the magnitude values magnitude values $a_k$, to obtain copied magnitude values $a_{sk}$ (also designated with $\alpha_{sk}$) representing a frequency bin having a frequency bin index sk of the first patch, wherein s is a stretching factor with s=2. Also, the apparatus is Advantageously configured to copy and scale phase values $\varphi_k$ associated with a frequency bin having frequency bin index k of the input signal representation, to obtain copied and scaled phase values $\varphi_{sk}$ associated with a frequency bin having a frequency index sk of the first patch. Also, the apparatus is Advantageously configured to copy values $\beta_{k-i\zeta}$ associated with a frequency bin k-i$\zeta$ of the spectral-domain representation of the first patch, to obtain values $\beta_k$ of the spectral-domain representation of the second patch. Also, the apparatus is Advantageously configured to convert the representation of the bandwidth-extended signal (which comprises the spectral-domain representation of the first patch and the spectral-domain representation of the second patch) into the time-domain, to obtain a time-domain representation, and to apply a synthesis window to the time-domain representation. Using the above-described concept, it is possible to obtain a bandwidth-extended signal with moderate computational complexity. The bandwidth-extension is performed in the frequency-domain, wherein a transform may be performed into a spectral domain, for example, into a FFT domain or a QMF domain.

In an advantageous embodiment, the apparatus comprises a time-domain to spectral-domain converter (for example, a Fast-Fourier-Transform means or a QMF filterbank) configured to provide, as the input signal representation, values of a spectral domain representation (for example, Fast-Fourier-Transform coefficients or QMF subband signals) of an input audio signal, or of a preprocessed (e.g. down-sampled and/or windowed) version of the input audio signal (for example a pulse-code-modulated signal provided by an audio decoder core). The apparatus Advantageously comprises a spectral-domain to time-domain converter (for example, an inverse Fast-Fourier-Transform means or a QMF synthesis means) configured to provide a time-domain representation of the bandwidth-extended signal using values of the spectral-domain representation (e.g. FFT coefficients, or QMF subband signals) of the first patch and values of the spectral domain representation (e.g. FFT coefficients, or QMF subband signals) of the second patch. The spectral-domain to time-domain converter is Advantageously configured such that a number of different spectral values (e.g. FFT bins or QMF bands) received by the spectral-domain-to-time-domain converter is larger than a number of different spectral values (e.g. a number of FFT frequency bins, or a number of QMF bands) provided by the time-domain-to-spectral-domain converter (e.g. Fast-Fourier-Transform means or QMF filterbank), such that the spectral-domain-to-time-domain converter is configured to process a larger number of frequency bins (e.g. Fast-Fourier-Transform frequency bins or QMF frequency bands) than the time-domain-to-frequency-domain converter. Accordingly, a bandwidth-extension is reached by the fact that the spectral-domain-to-time-domain converter comprises a larger number of frequency bins than the time-domain-to-frequency-domain converter.

In an advantageous embodiment, the apparatus comprises an analysis windower configured to window a time-domain input audio signal, to obtain a windowed version of the time-domain input audio signal, which forms the basis for obtaining the input signal representation. Also, the apparatus comprises a synthesis windower configured to window a portion of a time-domain representation of the bandwidth-extended signal, to obtain a windowed portion of the time-domain representation of the bandwidth-extended signal. Accordingly, artifacts in the bandwidth-extended signal are reduced or even avoided.

In an advantageous embodiment, the apparatus is configured to process a plurality of temporally overlapping time-shifted portions of the time-domain input audio signal, to obtain a plurality of temporally overlapping time-shifted windowed portions of the time-domain representation of the bandwidth-extended signal. A time-offset between temporally adjacent time-shifted portions of the time-domain input audio signal is smaller than or equal to one fourth of a window length of the analysis window. It has been found that a comparatively large temporal overlap between adjacent time-shifted portions of the time-domain input audio signal (and/or a comparatively large temporal overlap between temporally adjacent time-shifted portions of the time-domain representation of the bandwidth-extended signal) results in a bandwidth-extension bringing along a good hearing impression, because non-stationarities of the signal are taken into account because of the comparatively large temporal overlap.

In an advantageous embodiment, the apparatus comprises a transient information provider configured to provide an information indicating the presence of a transient in the input signal (represented by the input signal representation). The apparatus also comprises a first processing branch for providing a representation of a bandwidth-extended signal portion on the basis of a non-transient portion of the input signal representation and a second processing branch for providing a representation of a bandwidth-extended signal portion on the basis of a transient portion of the input signal representation. The second processing branch is configured to process a spectral-domain representation of the input signal having a higher spectral resolution than a spectral domain representation of the input signal processed by the first processing branch. Accordingly, signal portions comprising a transient can be treated with higher spectral resolution, which avoids audible artifacts in the presence of transients. On the other hand, a reduced spectral resolution can be used for non-transient signal portions (i.e. for signal portions in which the transient information provider does not identify a transient). Thus, a computational efficiency is kept high, and the increased spectral resolution is used only when it brings along advantages (for example, in that it results in a better hearing impression in the proximity of transients).

In an advantageous embodiment, the apparatus comprises a time-domain zero-padder configured to a zero-pad a transient portion of the input signal, in order to obtain a temporally extended transient portion of the input signal. In this case, the first processing branch comprises a (first) time-domain-to-frequency-domain converter configured to provide a first number of spectral domain values associated with a non-transient portion of the input signal, and the second processing branch comprises a (second) time-domain-to-frequency-domain converter configured to provide a second number of spectral domain values associated with the temporally extended transient portion of the input signal. The second number of spectral-domain values is larger, at least by a factor of 1.5, than the first number of spectral domain values. Accordingly, a good transient handling is obtained.

In an advantageous embodiment, the second processing branch comprises a zero-stripper configured to remove a plurality of zero values from a bandwidth-extended signal portion obtained on the basis of the temporally extended transient portion of the input signal. Accordingly, the temporal extension of the input signal, which is obtained by the zero-padding, is reversed.

In an advantageous embodiment, the apparatus comprises a down-sampler configured to down-sample a time-domain representation of the input signal. By down-sampling the input signal, a computational efficiency can be improved if the input signal does not cover the full Nyquist bandwidth of a pulse-code-modulated sample input stream.

Another embodiment according to the invention creates an apparatus, in which the processing order of the processing by the value copier and the phase vocoder is inversed. 15.

Such an apparatus for generating a representation of a bandwidth-extended signal on the basis of an input signal representation (110; 383) comprises a value copier configured to copy a set of values of the input signal representation, to obtain a set of values of a spectral domain representation of a first patch, wherein the first patch is associated with higher frequencies than the input signal representation. The apparatus also comprises a phase vocoder (130; 406) configured to obtain values $(\beta_{2\xi} \ldots \beta_{3\xi})$ of a spectral domain representation of a second patch of the bandwidth-extended signal on the basis of the values $(\beta_{4/3\xi} \ldots \beta_{2\xi}$ of the spectral domain representation of the first patch, wherein the second patch is associated with higher frequencies than the first patch. The apparatus is configured to obtain the representation (120;426) of the bandwidth-extended signal using the values of the spectral domain representation of the first patch and the values of the spectral domain representation of the second patch.

This apparatus is capable of obtaining a bandwidth-extended signal with comparatively low computational complexity while still achieving a good hearing impression of the bandwidth-extended signal. By performing the phase vocoding after the copying operation, the phase vocoder can be operated with a comparatively small frequency ratio (ratio between vocoder output frequency and vocoder input frequency), which results in a good spectral filling and avoids the presence of large spectral holes. Also, it has been found that The hearing impression using this concept is still better than for a concept which merely relies on copying operations, without a phase vocoder action, even though the first patch (lower frequency patch) is obtained using the copying operation, and only the second patch (higher frequency patch) is obtained using the phase vocoding operation. Also, computational complexity is smaller than in systems in which all of the patches are generated using phase vocoders, and spectral holes are reduced when compared to such concepts.

Naturally, this embodiment can be supplemented by any of the functionalities discussed herein.

Other embodiments according to the invention create methods for generating a representation of a bandwidth-extended signal on the basis of an input signal representation. Said method is based on the same ideas as the above-discussed apparatus.

Another embodiment according to the invention creates a computer program for implementing the method.

BRIEF DESCRIPTION OF THE DRAWINGS

Embodiments of the present invention will be detailed subsequently referring to the appended drawings, in which.

DETAILED DESCRIPTION OF THE INVENTION

1. Apparatus According to FIG. 1

Figure 1:
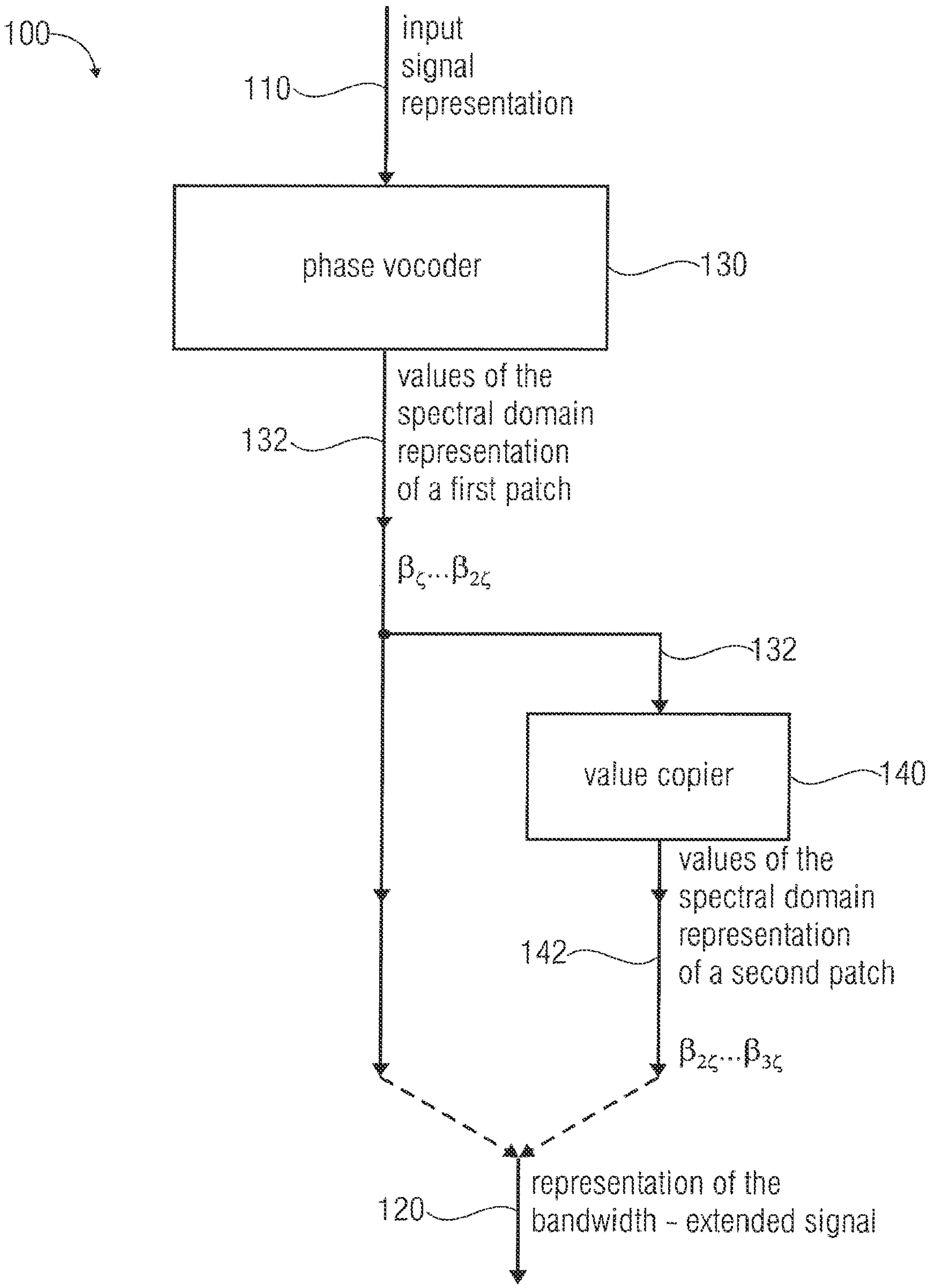
FIG. 1 shows a block-schematic diagram of an apparatus for generating a representation of a bandwidth-extended signal on the basis of an input signal representation, according to an embodiment of the invention.

FIG. 1 shows a block-schematic diagram of an apparatus 100 for generating a representation of a bandwidth-extended signal on the basis of an input signal representation. The apparatus 100 is configured to receive an input signal representation 110 and provide, on the basis thereof, a bandwidth-extended signal 120. The apparatus 100 comprises a phase vocoder configured to obtain values of a spectral-domain representation 130 of a first patch of the bandwidth-extended signal 120 on the basis of the input signal representation 110. The values of the spectral domain representation of the first patch are designated, for example, with $\beta_{\zeta}$ to $\beta_{2\zeta}$. The apparatus 100 also comprises a value copier 140 configured to copy a set of values of the spectral-domain representation 132 of the first patch, which are provided by the phase vocoder 130, to obtain a set of values of a spectral domain representation 142 of a second patch, wherein the second patch is associated with higher frequencies than the first patch. The values of the spectral domain representation 142 of the second patch are designated, for example, with $\beta_{2\zeta}$ to $\beta_{3\zeta}$. The apparatus 100 is configured to obtain the representation 120 of the bandwidth-extended signal using the values $\beta_{\zeta}$ to $\beta_{2\zeta}$ of the spectral domain representation 132 of the first patch and the values $\beta_{2\zeta}$ to $\beta_{3\zeta}$ of the spectral domain representation 142 of the second patch. For example, the representation 120 of the bandwidth-extended signal may comprise both the values of the spectral domain representation 132 of the first patch and the spectral domain representation 142 of the second patch. In addition, the representation 120 of the bandwidth-extended signal may, for example, comprise values of a spectral domain representation of the input signal (represented, for example, by the input signal representation 110). However, the representation 120 of the bandwidth-extended signal may also be a time-domain representation, which may be based on the values of the spectral domain representation 132 of the first patch and the values of the spectral domain representation 142 of the second patch (and, optionally, additional values, for example values of the spectral domain representation 116 of the input signal, and/or values of a spectral domain representation of additional patches).

In the following, the functionality and operation of the apparatus 100 will be described in detail taking reference to FIG. 2, which shows a schematic representation of the inventive concept for generating a representation of a bandwidth-extended signal on the basis of an input signal representation.

A first graphic representation 200 shows a harmonic transposition of the input signal (represented by the input signal representation 110), which is performed by the phase vocoder 130. As can be seen, the input signal is represented, for example, by a set of magnitude values $\alpha_k$. The index k designates a spectral bin (for example a bin having index k of a fast Fourier transform, or a frequency band having index k of a QMF conversion). The input signal representation 110 may, for example, comprise magnitude values $\alpha_k$ for k=1 to k=$\zeta$, wherein $\zeta$ may designate a so-called cross-over frequency bin and describes a frequency onset of the bandwidth-extension. A fundamental frequency range is further described, for example, by phase values $\varphi_k$, wherein k is a frequency bin index, as discussed before.

Similarly, the first patch is described by a set of values of a spectral domain representation, for example, values $\beta_k$ with k between $\zeta$ and $2\zeta$. Alternatively, the first patch may be represented by magnitude values $\alpha_k$ and phase values $\varphi_k$, with the frequency bin index k between $\zeta$ and $2\zeta$.

As mentioned, the phase vocoder 130 is configured to perform a harmonic transposition on the basis of the input signal representation 110 to obtain values of the spectral-domain representation 132 of the first patch. For this purpose, the phase vocoder 130 may set a magnitude value $\alpha_{2k}$ of a frequency bin having (frequency bin) index 2k to be equal to the magnitude value $\alpha_k$ of a frequency bin having (frequency bin) index k. Also, the phase vocoder 130 may be configured to set the phase value $\varphi_{2k}$ of a frequency bin having index 2k to a value which is equal to 2 times the phase value $\varphi_k$ associated with the frequency bin having index k. In this case, the frequency bin having index k may be a frequency bin of the input signal representation 110, and the frequency bin having index 2k may be a frequency bin of the spectral-domain representation 132 of the first patch. Also, a frequency bin having index 2k may comprise a frequency, which is a first harmonic of a frequency included in the frequency bin having index k. Accordingly, magnitude values $\alpha_{2k}$ and phase values $\varphi_{2k}$ may be obtained, which are values of the spectral domain representation 132 of the first patch, for 2k ranging from $\zeta$ to $2\zeta$, such that $\alpha_{2k}=\alpha_k$ and $\varphi_{2k}=2\varphi_k$. Alternatively, and equivalently, values $\beta_{2k}$, which are values of the spectral-domain representation 132 of the first patch, may be obtained for 2k between $\zeta$ and $2\zeta$, such that $\beta_{2k}=\alpha_k e^{j2\varphi_k}$.

To summarize, assuming that the frequency bins having indices k (or equivalently, 2k, and so on), which are, for example, frequency bins of a Fast Fourier Transform representation or frequency bands of a QMF domain representation, are spaced linearly in frequency (such that the frequency bin index, e.g. k or 2k, is at least approximately proportional to a frequency comprised in the respective frequency bin, for example, a center frequency of a k-th Fast Fourier Transform frequency bin or a center frequency of a k-th QMF band), a harmonic transposition is obtained by the phase vocoder 130.

However, the values of the spectral-domain representation 142 of the second patch are obtained by the value copier 140, which performs a non-harmonic copying up of values of the spectral-domain representation 132 of the first patch.

Taking reference now to the graphical representation 250, the non-harmonic copying up will be briefly discussed. As can be seen, the first patch is represented by values $\beta_\zeta$ to $\beta_{2\zeta}$ (or, equivalently, by magnitude values $\alpha_\zeta$ to $\alpha_{2\zeta}$ and phase values $\varphi_\zeta$ to $\varphi_{2\zeta}$. Accordingly, the values $\beta_{2\zeta}$ to $\beta_{3\zeta}$ (or, equivalently, magnitude values $\alpha_{2\zeta}$ to $_{\alpha 3\zeta}$ and phase values $\varphi_{2\zeta}$ to $\varphi_{3\zeta}$) of the spectral-domain representation 142 of the second patch are obtained by a non-harmonic copying, which is performed by the value copier 140. For example, complex-valued spectral values $\beta_{2\zeta}$ to $\beta_{3\zeta}$ of the spectral-domain representation 142 of the second patch may be obtained on the basis of corresponding values $\beta_\zeta$ to $\beta_{2\zeta}$ of the spectral-domain representation 132 of the first patch according to $\beta_k=\beta_{k-\zeta}$ for k between $2_\zeta$ and $3_\zeta$. Equivalently, magnitude values $\alpha_{2\zeta}$ to $\alpha_{3\zeta}$ of the spectral-domain representation 142 of the second patch may be obtained on the basis of magnitude values of the spectral domain representation 132 of the first patch according to $\alpha_k=\alpha_{k-\zeta}$ for k between $2\zeta$ and $3\zeta$. In this case, phase values $\varphi_{2\zeta}$ to $\varphi_{3\zeta}$ of the spectral-domain representation 142 of the second patch may be obtained on the basis of phase values $\varphi_\zeta$ to $\varphi_{2\zeta}$ of the spectral-domain representation 132 of the first patch according to $\varphi_k=\varphi_{k-\zeta}$ for k between $2\zeta$ and $3\zeta$.

Accordingly, the values of the spectral-domain representation 142 of the second patch represent a signal, which is non-harmonically (i.e. linearly) frequency-shifted with respect to a signal represented by the values of the spectral-domain representation 132 of the first patch.

The values $\beta_\zeta$ to $\beta_{2\zeta}$ of the spectral-domain representation 132 of the first patch and the values $\beta_{2\zeta}$ to $\beta_{3\zeta}$ of the spectral-domain representation 142 of the second patch may be used to obtain the representation 120 of the bandwidth-extended signal. Depending on the requirements, the representation 120 of the bandwidth-extended signal may be a spectral-domain representation or a time-domain representation. If it is desired to obtain a time-domain representation, a frequency-domain-to-time-domain converter may be used to derive the time-domain representation on the basis of the values $\beta_\zeta$ to $\beta_{2\zeta}$ of the spectral-domain representation 132 of the first patch and the values $\beta_{2\zeta}$ to $\beta_{3\zeta}$ of the spectral-domain representation 142 of the second patch. Alternatively (and equivalently) the values $\alpha_\zeta$ to $\alpha_{2\zeta}$, $\varphi_\zeta$ to $\varphi_{2\zeta}$, $\alpha_{2\zeta}$ to $\alpha_{3\zeta}$ and $\varphi_{2\zeta}$ to $\varphi_{3\zeta}$ may be used in order to derive the representation 120 of the bandwidth-extended signal (either in the spectral-domain or in the time-domain).

As discussed above, the concept described with respect to FIGS. 1 and 2 brings along a good hearing impression and comparatively low computational complexity. Phase vocoding may only be used once, even though a plurality of patches (for example the first patch and the second patch) are used. Also, it is avoided that there are large spectral holes in the second patch, which would occur if another phase vocoder was used to obtain the second patch. Thus, the inventive concept brings along a very good tradeoff between computational complexity and an achievable hearing impression.

Moreover, it should be noted that additional patches may be obtained on the basis of the values of the spectral-domain representation 132 of the first patch in some embodiments. For example, in an optional extension of the inventive concept, values of a spectral-domain representation of a third patch may be obtained on the basis of the values of the spectral domain representation 132 of the first patch using another value copier, as will be described in more detail taking reference to FIG. 3.

Figure 2:
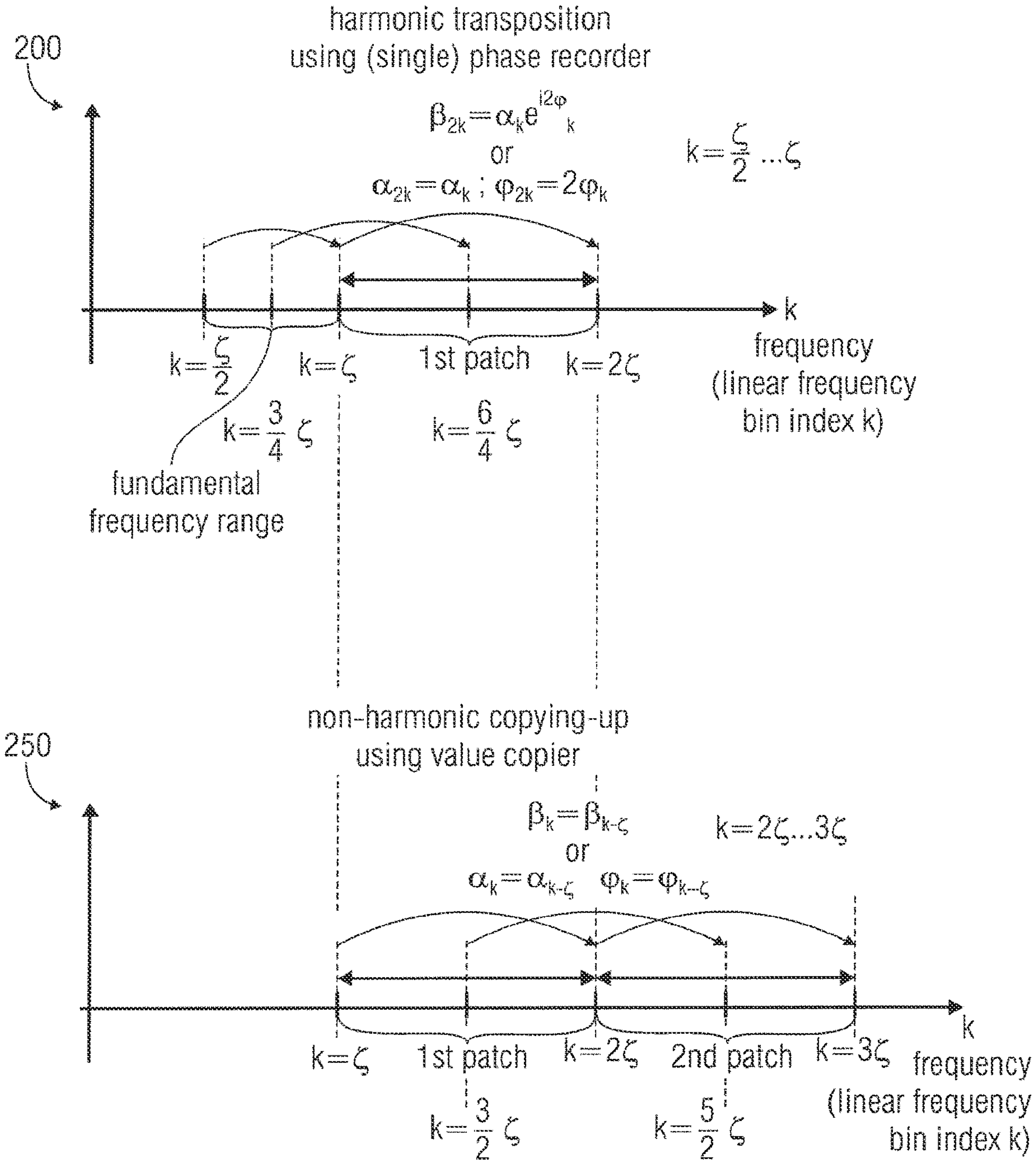
FIG. 2 shows a schematic representation of the bandwidth extension concept, according to the present invention.

The embodiments according to FIGS. 1 and 2 (and also the other embodiments) can be modified in a wide variety of ways. For example A first patch can be obtained using a phase vocoder, and second, third and fourth patches can be obtained by a copying-up operation of spectral values. Alternatively, a first and a second patch can be obtained using phase vocoders, and a third and a fourth patch can be obtained using a copying-up of spectral values. Naturally, different combinations of the phase vocoding operation and the copying-up operation can be applied.

Alternatively, however, a first patch can be obtained using a copying-up operation (value copier) of spectral values off the input signal representation, and a second patch can be obtained using a phase vocoder (on the basis of the copied values of the first patch, obtained using the value copier).

Figure 3A:
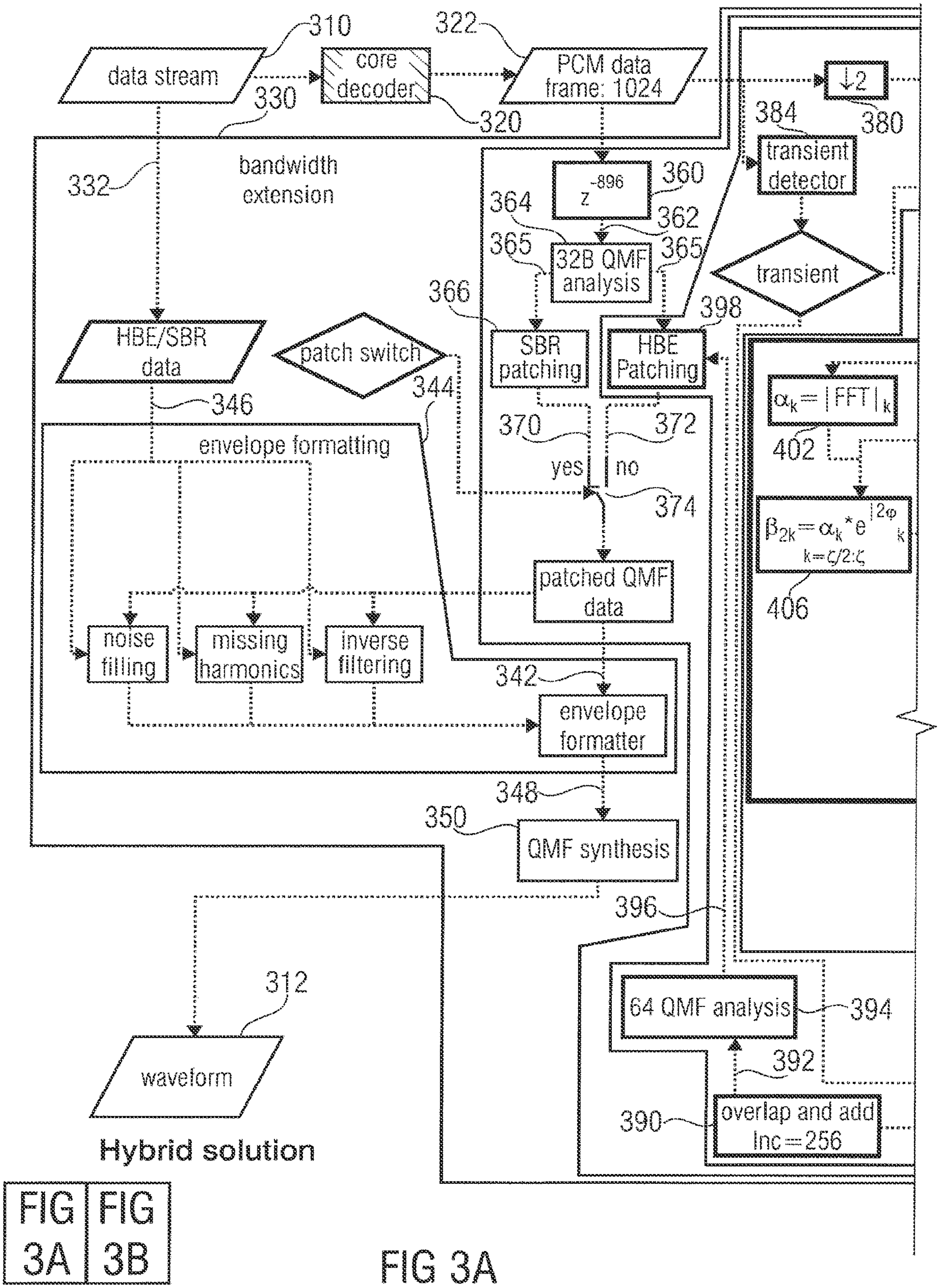
FIGS. 3*a-b* shows a detailed block-schematic diagram of an audio decoder comprising an apparatus for generating a representation of a bandwidth-extended signal on the basis of an input signal representation, according to an embodiment of the invention.
Figure 3B:
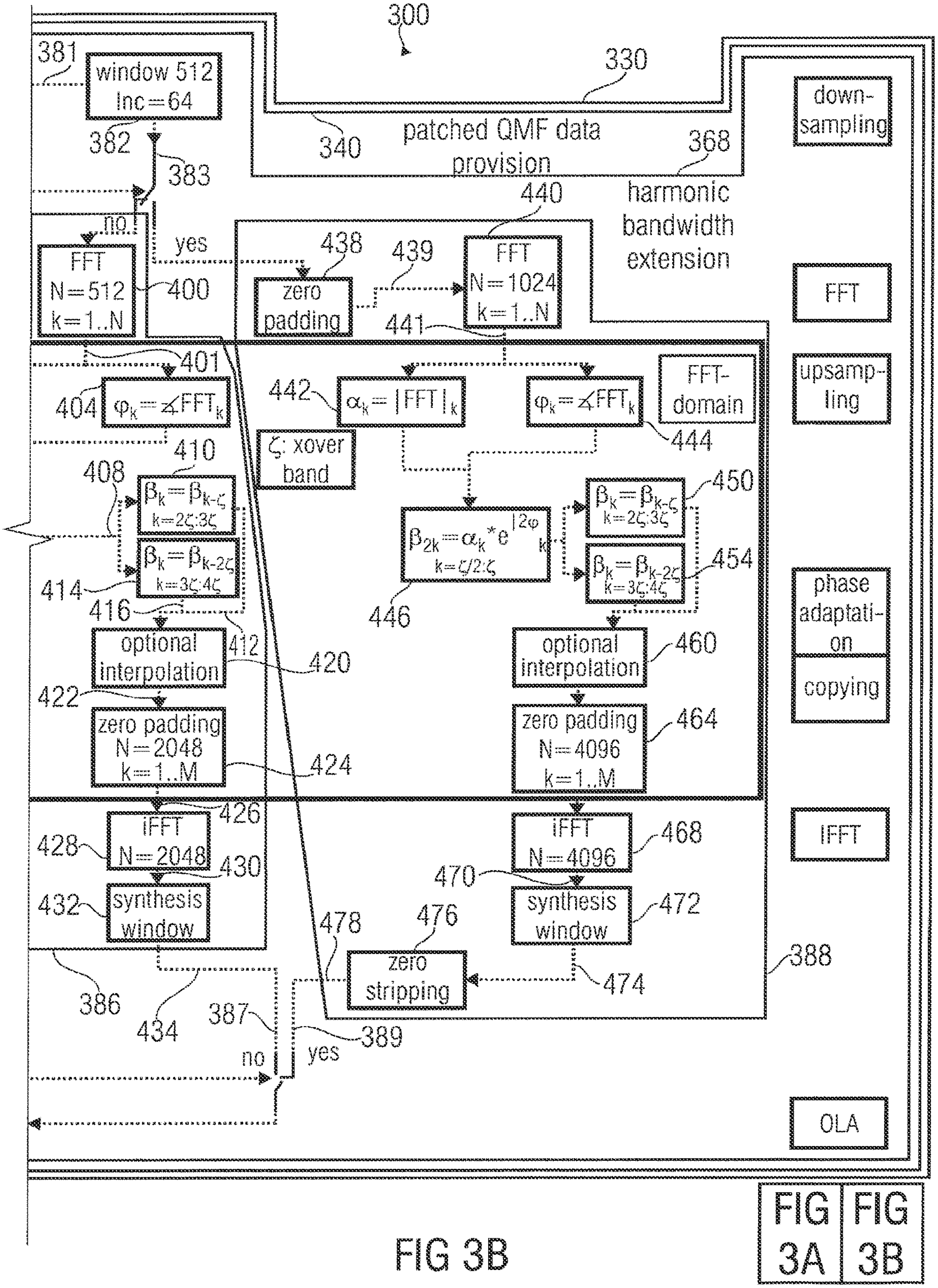

In the following, an audio decoder 300 will be described taking reference to FIG. 3, wherein FIG. 3 shows a detailed block-schematic diagram of such an audio decoder 300 comprising an apparatus for a generating a representation of a bandwidth-extended signal on the basis of an input signal representation.

2.1. Audio Decoder Overview

The audio decoder 300 is configured to receive a data stream 310 and to provide, on the basis thereof, an audio waveform 312. The audio decoder 300 comprises a core decoder 320, which is configured to provide, for example, pulse-code-modulated data ("PCM data") 322 on the basis of the data stream 310. The core decoder 320 may for example be an audio decoder as described in the international standard ISO/IEC 14496-3:2005(e), part 3: audio, subpart 4: general audio coding (GA)-AAC, Twin VQ, BSAC. For example, the core decoder 320 may be a so-called advanced-audio-coding (AAC) core decoder, which is described in said standard, and which is well-known to the man skilled in the art. Thus, the pulse-code-modulated audio data 322 may be provided by the core decoder 220 on the basis of the data stream 310. For example, the pulse-code-modulated audio data 322 may comprise the frame length of 1024 samples.

The audio decoder 300 also comprises a bandwidth-extension (or bandwidth extender) 330, which is configured to receive the pulse-code-modulated audio data 322 (for example, a frame length of 1024 samples) and to provide, on the basis thereof, the waveform 312. The bandwidth-extension (or bandwidth extender) 330 also receives some control data 332 from the data stream 310. The bandwidth-extension 330 comprises a patched QMF data provision (or patched QMF data provider) 340, which receives the pulse-code-modulated audio data 322 and which provides, on the basis thereof, patched QMF data 342. The bandwidth-extension 330 also comprises an envelope formatting (or envelope formatter) 344, which receives the patched QMF data 342 and envelope formatting control data 346 and provides, on the basis thereof, patched and envelope-formatted QMF data 348. The bandwidth-extension 330 also comprises a QMF synthesis (or QMF synthesizer) 350, which receives the patched and envelope-formatted QMF data 348 and provides, on the basis thereof, the waveform 312 by performing a QMF synthesis.

2.2. Patched QMF Data Provision 340

2.2.1. Patched QMF Data Provision—Overview

The patched QMF data provision 340 (which may be performed by a patched QMF data provider 340 in a hardware implementation) may be switchable between two modes, namely a first mode, in which a spectral band replication (SBR) patching is performed, and a second mode in which a harmonic bandwidth-extension (HBE) patching is performed. For example, the pulse-code-modulated audio data 322 may be delayed by a delayer 360, to obtain delayed pulse-code-modulated audio data 362, and the delayed pulse-code-modulated audio data 362 may be converted into a QMF domain using a 32 band QMF analyzer 364. The result of the 32 band QMF analyzer 364, for example, a 32 band QMF domain (i.e. spectral-domain) representation 365 of the delayed pulse-code-modulated audio data 362, may be provided to a SBR patcher 366 and to a harmonic bandwidth-extension patcher 368.

The spectral band replication patcher 366 may, for example, perform a spectral band replication patching, which is described, for example, in section 4.6.18 "SBR tool" of the international standard ISO/IEC 14496-3:2005 (e), part 3, subpart 4. Accordingly, a 64 band QMF domain representation 370 may be provided by the spectral-band-replication patcher 366.

Alternatively, or in addition, the harmonic-bandwidth-extension patcher 368 may provide a 64 band QMF domain representation 372, which is a bandwidth-extended representation of the PCM audio data 322. A switch 374, which is controlled in dependence on bandwidth-extension control data 332 extracted from the data stream 310, may be used to decide whether the spectral band replication patching 366 or the harmonic bandwidth-extension patching 368 is applied in order to obtain the patched QMF data 342 (which may be equal to the a 64 band QMF domain representation 370 or equal to the 64 band QMF domain representation 372 depending on the state of the switch 374).

2.2.2. Patched QMF Data Provision—Harmonic Bandwidth-Extension 368

In the following, the (at least partially) harmonic bandwidth-extension patching 368 will be described in more detail. The harmonic bandwidth-extension patching 368 comprises a signal path, in which pulse-code-modulated audio data 322, or a pre-processed version thereof, are converted into a spectral-domain (for example into a Fast-Fourier-Transform coefficient domain or a QMF domain), in which a harmonic bandwidth-extension is performed in the spectral-domain, and in which the obtained spectral domain representation of the bandwidth-extended signal, or a representation derived therefrom, is used for the harmonic bandwidth-extension patching.

In the embodiment of FIG. 3, the pulse-code-modulated audio data 322 are down-sampled in a down-sampler 380, for example, by a factor of 2, to obtain down-sampled pulse-code-modulated audio data 381. The down-sampled pulse-code-modulated audio data 381 are subsequently windowed by a windower 382, which may, for example, comprise a window length of 512 samples. It should be noted that the window is, for example, shifted by 64 samples of the down-sampled pulse-code-modulated audio data 381 in subsequent processing steps, such that a comparatively large overlap of the windowed portions 383 of the down-sampled pulse-code-modulated audio data is obtained.

The audio decoder 300 also comprises a transient detector 384, which is configured to detect a transient within the pulse-code-modulated audio data 322. The transient detector 384 may detect the presence of a transient either on the basis of the PCM audio data 322 itself, or on the basis of a side information, which is included in the data stream 310.

The windowed portions 383 of the down-sampled PCM audio data 381 can be selectively processed using a first processing branch 386 or a second processing branch 388. The first branch 386 may be used for processing a non-transient windowed portion 383 of the down-sampled PCM audio data (for which the transient detector 384 denies the presence of a transient), and a second branch 388 may be used for a processing of a transient windowed portion 383 of the down-sampled PCM audio data (for which the transient detector 384 indicates the presence of a transient).

The first branch 386 receives a non-transient windowed portion 383 and provides, on the basis thereof, a bandwidth-extended representation 387,434 of the windowed portion 383. Similarly, the second branch 388 receives a transient windowed portion 383 of the down-sampled PCM audio data 381 and provides, on the basis thereof, a bandwidth-extended representation 389 of the (transient) windowed portion 383. As discussed above, the transient detector 384 decides whether the current windowed portion 383 is a non-transient windowed portion or a transient windowed portion, such that the processing of the current windowed portion 383 is performed either using the first branch 386 or the second branch 388. Thus, different windowed portions 383 may be processed by different branches 386, wherein there is a significant temporal overlap between the subsequent bandwidth-extended representations 387, 389 of the subsequent windowed portions 383 (because there is a significant temporal overlap of temporally subsequent windowed portions 383).

The harmonic bandwidth-extension 368 further comprises an overlapper-and-adder 390, which is configured to overlap-and-add the different bandwidth-extended representations 387, 389 associated with different (temporally subsequent) windowed portions 383. An overlap-and-add increment may, for example, be set to 256 samples. Accordingly, an overlapped-and-added signal 392 is obtained.

The harmonic bandwidth-extension 368 also comprises a 64-band QMF analyzer 394, which is configured to receive the overlapped-and-added signal 392 and to provide, on the basis thereof, a 64-band QMF domain signal 396. The 64 band QMF-domain signal 396 may for example represent a broader frequency range than the 32-band QMF domain signal 365 provided by the 32-band QMF analyzer 364.

The harmonic bandwidth-extension 368 also comprises a combiner 398, which is configured to receive both the 32-band QMF-domain signal provided by the 32-band QMF analyzer 364 and the 64-band QMF domain signal 396 and to combine those signals. For example, the low-frequency-range (or fundamental frequency range) components of the 64-band QMF domain signal 396 may be replaced by, or combined with, the 32-band QMF-domain signal 365 provided by the 32-band QMF analyzer 364, such that, for example, the 32 lower-frequency-range (or fundamental frequency range) components of the 64-band QMF domain signal 372 are determined by the output of the 32-band QMF analyzer 364, and such that the 32 higher-frequency-range components of the 64-band QMF-domain signal 372 are determined by the 32 higher-frequency-range components of the 64-band QMF domain signal 396.

Naturally, the number of components of the QMF-domain signals may vary, depending on the specific requirements. Naturally, a frequency position of a transition between a fundamental frequency range (also designated as lower-frequency-range) and a bandwidth-extended frequency range (also designated as higher-frequency-range) may depend on the cross-over frequency, or, equivalently, the bandwidth of the audio signal represented by the pulse-code-modulated audio data 322.

In the following, details regarding the first processing branch 386 will be described. The first branch 386 comprises a time-domain-to-frequency-domain converter 400, which is implemented, for example, in the form of a Fast-Fourier-Transform-means configured to provide 512 Fast-Fourier-Transform coefficients on the basis of a windowed portion 383 of 512 time-domain samples of the down-sampled pulse-code-modulated audio data 381. Accordingly, the Fast-Fourier-Transform frequency bins are designated with subsequent integer frequency bin indices k in a range between 1 and N=512.

The first branch 386 also comprises a magnitude value provider 402, which is configured to provide magnitude values $\alpha_k$ of the Fast-Fourier-Transform coefficients. Also, the first branch 386 comprises a phase value provider 404 configured to provide phase values $\varphi_k$ of the Fast-Fourier-Transform coefficients.

The first branch 386 also comprises a phase vocoder 406, which may receive the magnitude values $\alpha_k$ and the phase values $\varphi_k$ as an input signal representation, and which may comprise the functionality of the phase vocoder 130 discussed above. Accordingly, the phase vocoder 406 may output values $\beta_{2k}$, in a range between $\beta_\xi$ and $\beta_{2\xi}$, of a spectral domain representation of a first patch. The values $\beta_{2k}$ are designated with 408, and may be equivalent to the values of the spectral-domain representation 132 of a first patch. The first branch 386 also comprises a value copier 410, which may take over the functionality of the value copier 140, and which may receive, as an input information, the values $\beta_{2k}$ (e.g. in a range between $\beta_\xi$ and $\beta_{2\xi}$). Accordingly, the first value copier 410 may provide values $\beta_{2k}$ in a range between $\beta_{2\xi}$ and $\beta_{3\xi}$, which are designated with 412 and which may be equivalent to the values $\beta_{2\xi}$ to $\beta_{3\xi}$ of the spectral-domain representation 142 of the second patch. Also, the first branch 386 may (optionally) comprise a second value copier 414, which is configured to receive the values $\beta_\xi$ and $\beta_{2\xi}$. (also designated with 408) provided by the phase vocoder 406 and to provide, on the basis thereof, spectral values $\beta_{3\xi}$ to $\beta_{4\xi}$ using a copy-operation (which effectively results in a non-harmonic frequency-shift of the spectrum described by the values $\beta_\xi$ to $\beta_{2\xi}$ (408)). Accordingly, the second value copier 414 provides spectral values $\beta_{3\xi}$ to $\beta_{4\xi}$ of a spectral-domain representation of a third patch, which are also designated 416.

The first branch 386 may comprise an optional interpolator 420, which may be configured to receive the values 412, 416 of the spectral-domain representations of the second patch and of the third patch (and, optionally, also the values 408 of the spectral domain representation of the first patch) and to provide interpolated values 422 of the spectral-domain representation of the second and third patch (and, optionally, also of the first patch).

The first branch 386 may additionally comprise a zero padder 424, which is configured to receive the interpolated values 422 (or, alternatively, the original values 412, 416) of the spectral-domain representations of the second and third patch (and, optionally also of the first patch) and to obtain, on the basis thereof, a zero-padded version of values of a spectral-domain representation, which is zero-padded in order to be adapted to a dimension of a spectral-domain-to-time-domain converter 428.

The spectral-domain-to-time-domain converter 428 may be implemented, for example, as an inverse Fast-Fourier-Transformer. For example, the inverse Fast-Fourier-Transformer 428 may be configured to receive a set of 2048 (optionally interpolated and zero-padded) spectral values, and to provide, on the basis thereof, a time-domain representation 430 of the bandwidth-extended signal portion. The first path 386 also comprises a synthesis windower 432, which is configured to receive the time-domain representation 430 of the bandwidth-extended signal portion and to apply a synthesis windowing, in order to obtain a synthesis-windowed time-domain representation of the bandwidth-extended signal portion 430.

The audio decoder 300 also comprises a second processing path 388, which performs a very similar processing when compared to the first path 386. However, the second path 388 comprises a time-domain zero-padder 438, which is configured to receive the windowed transient portion 383 of the down-sampled pulse-code-modulated audio data 381 and to derive a zero-padded version 439 from the windowed portion 383, such that a beginning of the zero-padded portion 439 and an end of the zero-padded portion 439 are padded with zeros, and such that the transient is arranged in a central region (between the zero padded beginning samples and the zero-padded end samples) of the zero-padded portion 439.

The second path 388 also comprises a time-domain-to-spectral-domain transformer 440, for example, a Fast-Fourier-Transformer or a QMF (quadrature-mirror-filterbank). The time-domain-to-spectral-domain transformer 440 typically comprises a larger number of frequency bins (for example, Fast-Fourier-Transform frequency bins, or QMF bands) than the time-domain-to-spectral-domain transformer 400 of the first branch. For example, the Fast-Fourier-Transformer 440 may be configured to derive 1024 Fast-Fourier-Transform coefficients from a zero-padded portion 439 of 1024 time domain samples.

The second branch 388 also comprises a magnitude value determinator 442 and a phase value determinator 444, which may comprise the same functionality as the corresponding means 402, 404 of the first branch 386, though with increased dimension N=1024. Similarly, the second branch 388 also comprises a phase vocoder 446, a first value copier 450, a second value copier 454, an optional interpolator 460, and an optional zero padder 464, which may comprise the same functionalities as the corresponding means of the first branch 386, though with increased dimensions. In particular, the index $\xi$ of the cross-over band may be higher in the second branch 388 than the first branch 386, for example, by a factor of 2.

Accordingly, a spectral-domain representation comprising, for example, 4096 Fast-Fourier-Transform coefficients may be provided to an inverse Fast-Fourier-Transformer 468, which in turn provides a time-domain signal 470 having 4096 samples.

The second branch 388 also comprises a synthesis windower 472, which is configured to provide a windowed version of the time-domain-representation 470 of the bandwidth-extended signal portion.

The second branch 388 also comprises a zero stripper configured to provide a shortened, windowed time-domain representation 478 of the bandwidth-extended signal portion, which shortened, windowed time-domain representation 478 may, for example, comprise 2048 samples.

Accordingly, the time-domain representation 387 is used for non-transient portions (e.g. audio frames) of the pulse-code-modulated audio data 322, and the time-domain representation 478 is used for transient portions of the pulse-code-modulated audio data 322. Accordingly, transient portions are processed with higher spectral-domain resolution in the second processing branch 388, while non-transient portions are processed with lower spectral resolution in the first processing branch 386.

2.3. Envelope Formatting 344

In the following the envelope formatting 344 will be briefly summarized. In addition, reference is made to the respective remarks in the introductory section, which also apply to the inventive concept.

The patched QMF data 342, which are obtained on the basis of the 64 band QMF domain signal 396, are processed by the envelope formatting 344, to obtain the signal representation 348, which is input into the QMF synthesizer 350. The envelope formatting may for example adapt the QMF domain band signals of the patched QMF data 342 in order to perform a noise filling, in order to reconstruct missing harmonics, and/or in order to obtain an inverse filtering. Variations of noise filling, missing harmonics insertion and inverse filtering may for example be controlled by a side information 346, which may be extracted from the data stream 310. For further details, reference is made, for example, to the discussion of the SBR tool in section 4.6.18 of the International Standard ISC/IEC 14496-3:2005(e), part 3, subpart 4. However, different concepts of envelope formatting may also be applied in accordance with the requirements.

3. Discussion and Comparison of Different Solutions

In the following, a brief discussion and summary of the inventive solution will be provided.

Embodiments according to the present invention, for example the apparatus 100 according to FIG. 1 and the audio decoder 300 according to FIG. 3, are (or comprise) new patching algorithms inside spectral band replication (SBR). Spectral domain patching in different manners can be used in order to account for different signal characteristics or restrictions dictated by soft- or hardware requirements.

Figure 5A:
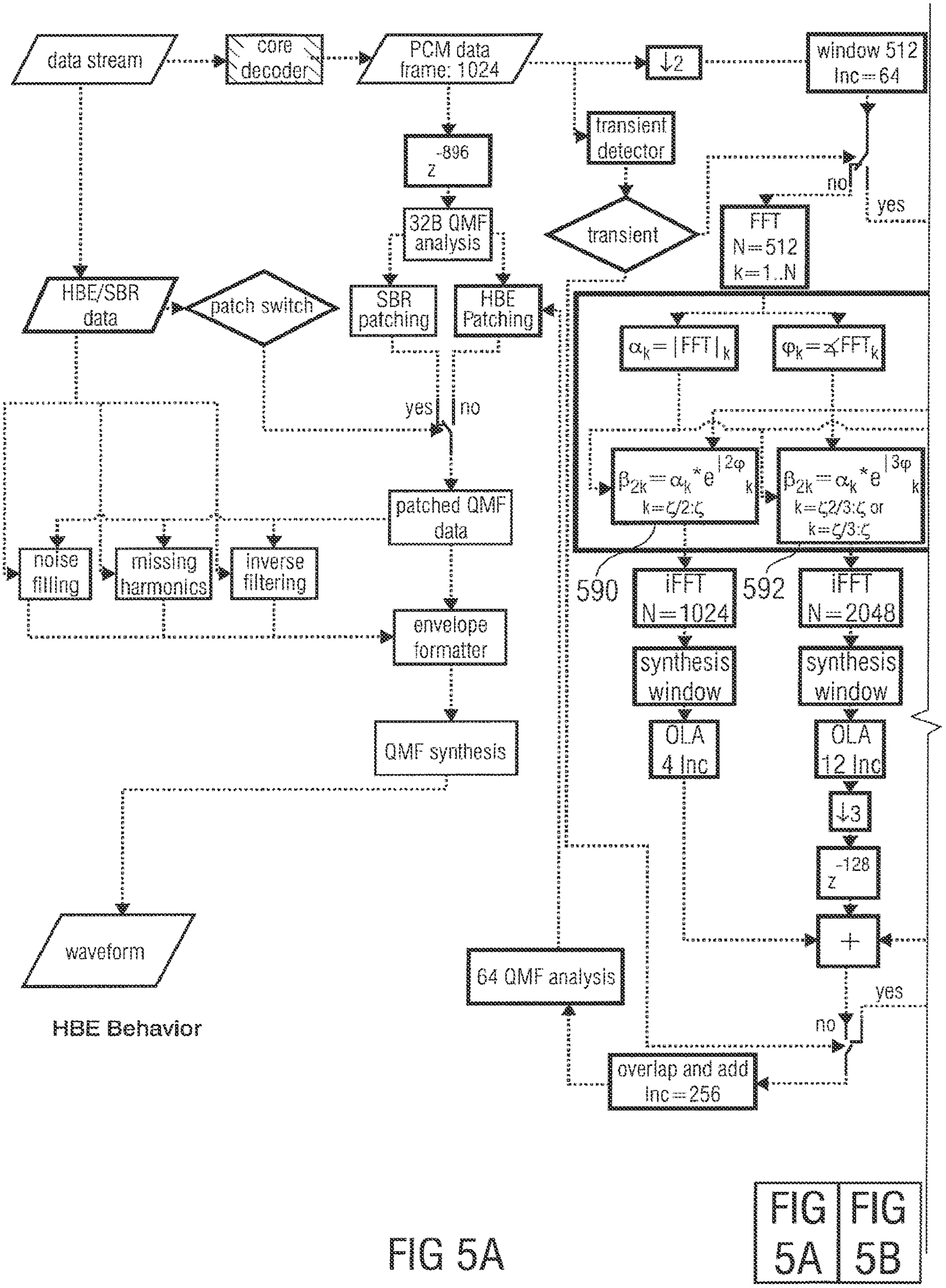
FIGS. 5*a-b* shows a block-schematic diagram of an audio decoder, according to a first comparison example.
Figure 5B:
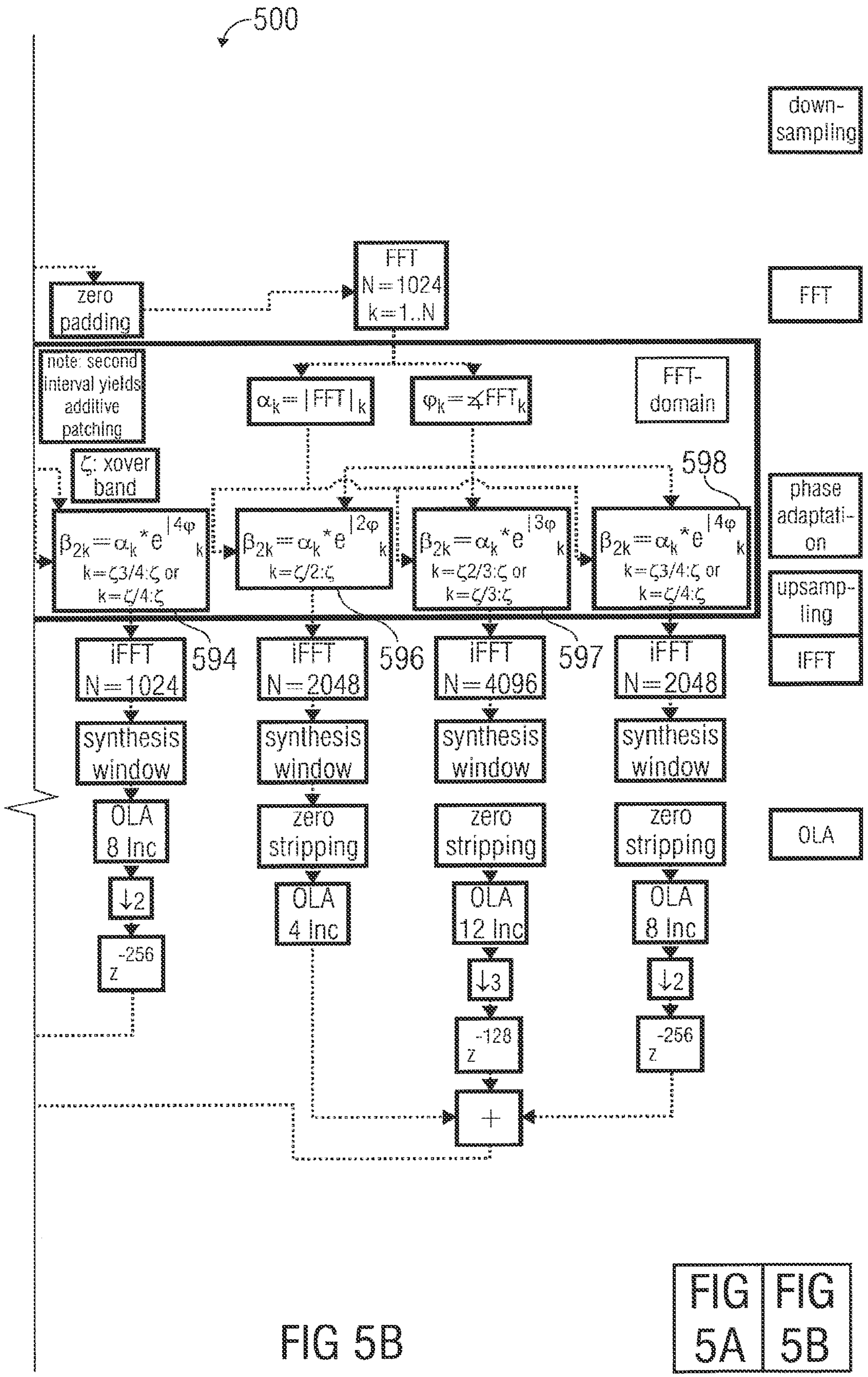

In standard SBR, patching is carried out by a copy operation inside the QMF domain. This can sometimes lead to auditory artifacts, particularly if sinusoids are copied into vicinity of each other at the border of LF and generated HF part. Therefore, a new patching algorithm has been introduced that avoids some problems by using a phase vocoder (see, for example, Reference [13]). This algorithm is illustrated in FIG. 5 as a comparison example.

The standard SBR has the problem of auditory artifacts. The phase vocoder approach presented in Reference [13] has a complexity, particularly because of the high number of Fast Fourier Transforms that need to be calculated. Additionally, the spectrum becomes very sparse for high patches (high stretching factors), which may result in undesired audio artifacts.

Figure 6A:
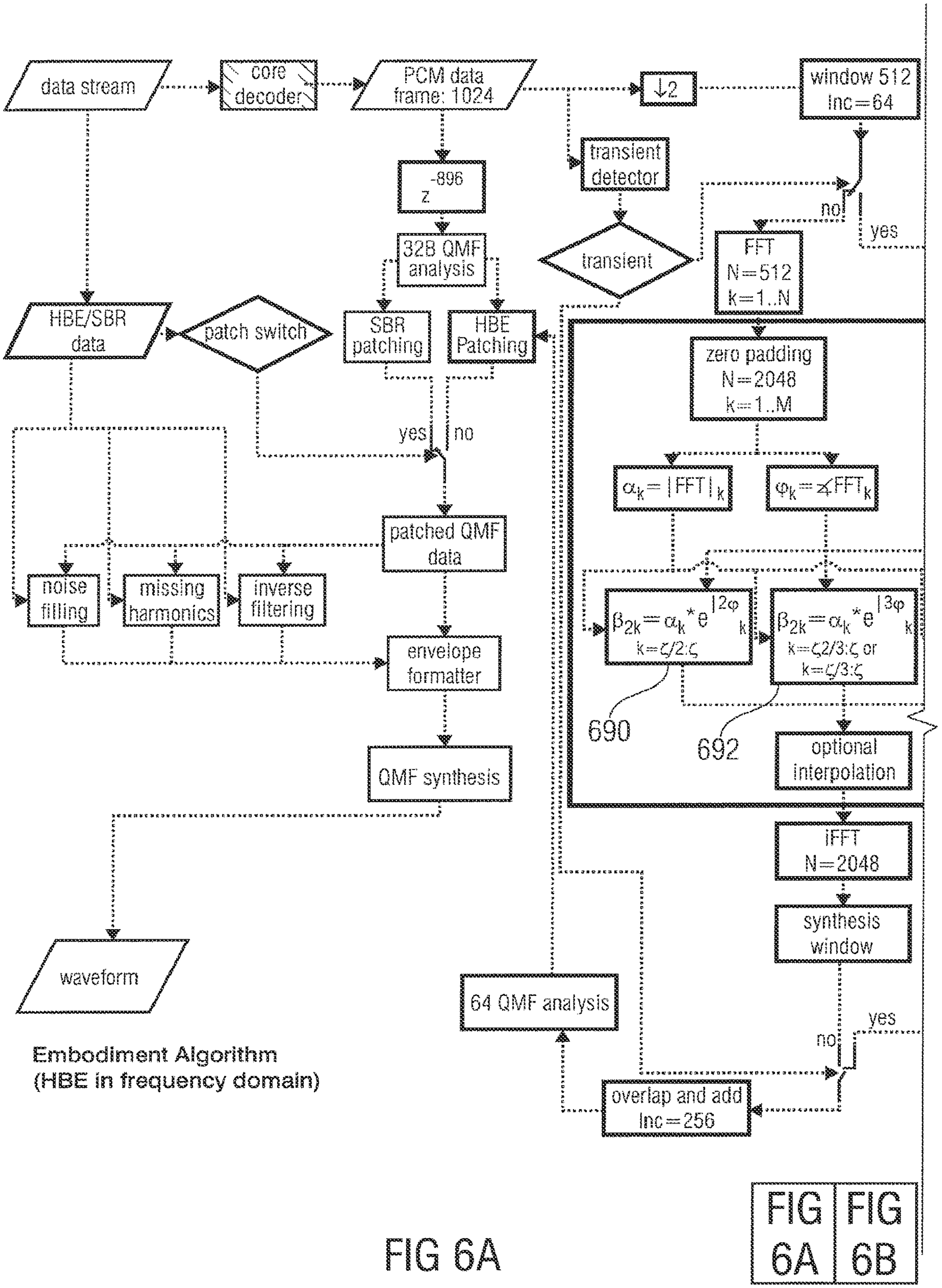
FIGS. 6*a-b* shows a block-schematic diagram of an audio decoder, according to a second comparison example.
Figure 6B:
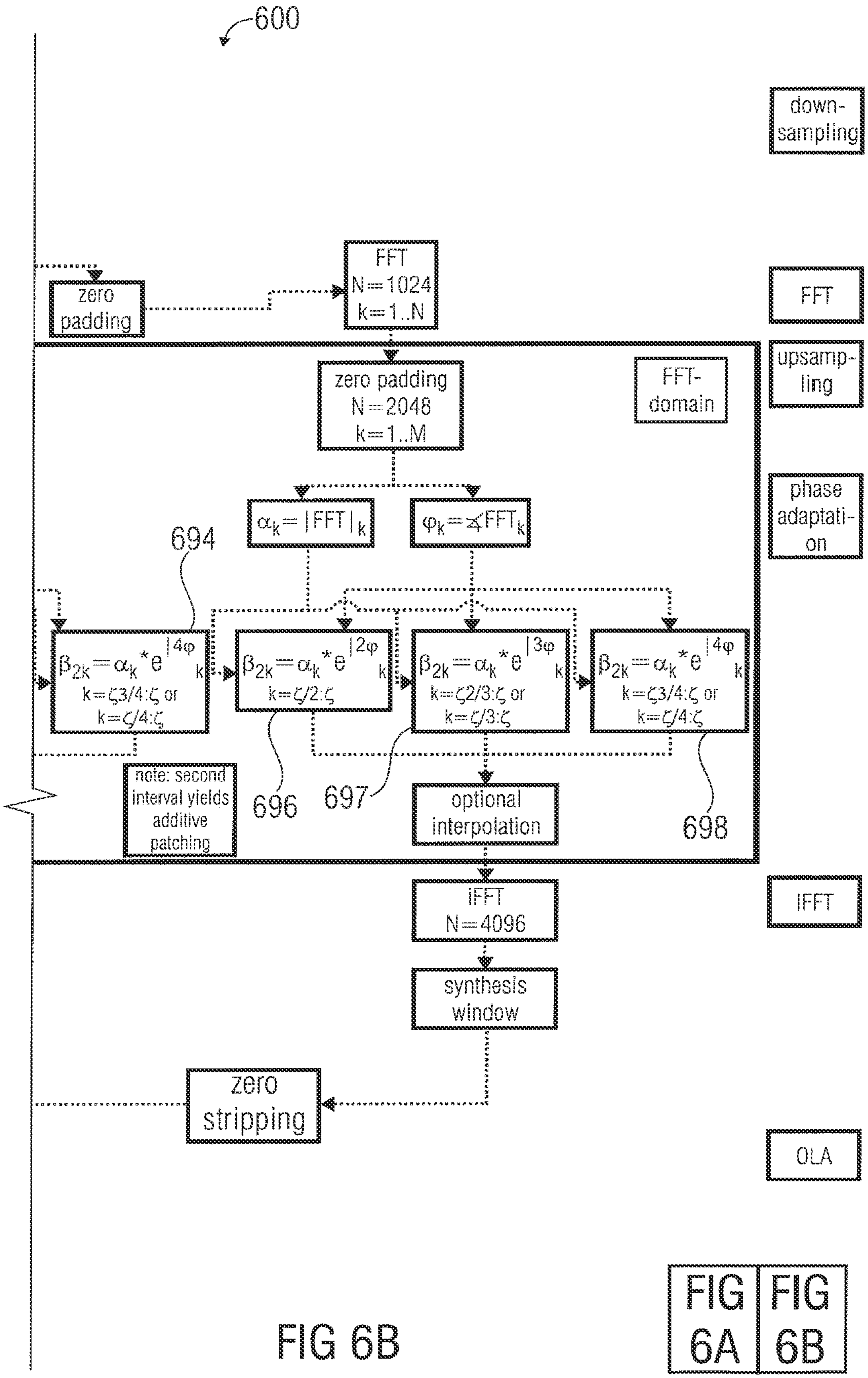

Two embodiments avoid the high number of Fast Fourier Transforms by moving the generation of different patches from the time domain to the frequency domain. In FIG. 6, an example is given in which the transformation to the frequency-domain is achieved with the help of a Fast Fourier Transform. Instead of the Fourier Transformation, other time-frequency transformations are, however, useable.

FIG. 3 shows a hybrid solution of the algorithm of FIG. 6 for SBR patching. Only the first patch is generated by the phase vocoder algorithm (for example, block 406 of the first branch 386, and block 446 of the second branch 388) while higher patches (for example, the second patch and the third patch) are created just by copying the first patch (for example, using the value copiers 410, 414 of the first branch 386, and/or the value copiers 450, 454 of the second branch 388). This yields a less sparse spectrum.

In the following the comparison algorithm, which is implemented in the audio decoder shown in FIG. 6, and the inventive algorithm, which is implemented in the audio decoder shown in FIG. 3, will be shortly explained:

The comparison algorithm or reference algorithm, which is implemented in the audio decoder shown in FIG. 6, comprises the following steps:

1. Signal downsampling (if Nyquist criterion is not harmed)
2. Signal is windowed ("Hann" windows are proposed but other window shapes may be used) and so called grains (for example, windowed signal portions 383) of lengths N are taken from the signal. The windows are shifted over the signal with a hop size H. A N/H=8 times overlap is proposed.
3. If the grain (for example, a windowed signal portion 383) contains a transient event at the edges, it is padded (for example, by the zero padder 438) with zeros which leads to an oversampling in frequency domain.
4. Grains are transformed to frequency domain (for example, using the time-domain-to-spectral-domain transformers 400,440).
5. Frequency domain grains are (optionally) padded to a desired output length of the patching algorithm.
6. Magnitude and phase are calculated (for example, using the means 402, 404, 442, 444).
7. Frequency bin content n is copied to position sn for stretching factor s. The phase is multiplied with the stretching factor s. This is done for all stretching factors s (only for the regions in the spectrum that cover the desired patches). (a) $\zeta\cdot(s-1)/s \leq n \leq \zeta$ or (b) $\zeta/s \leq n \leq \zeta$; (b) yields a more dense spectrum than (a) as the patches overlap. The $\zeta$ denotes the highest frequency of the LF part, the so called cross over frequency. Generally speaking, the phase is corrected for a new sample position (e.g., frequency position), which can be achieved using the algorithm discussed here or any appropriate alternative algorithm.
8. Frequency domain bins that get no data by the copying can be filled by applying an interpolation function (for example, using the interpolators 420,460).
9. Grains are transformed back to time domain (for example, using the inverse Fast Fourier Transformers 428,468).
10. Time domain grains are multiplied with a synthesis window (again Hann windows are proposed) (for example using the synthesis windowers 432,472).
11. If zero padding in step 3 was carried out, zeros are stripped again (for example, using the zero stripper 476).
12. Bandwidth extended signal or frame (for example, signal 392), respectively, is created using overlap and add (OLA) (for example, using overlap-and-add 390).

However, the order of the individual steps can also be exchanged in some alternative embodiments, and some of the steps can be merged into a single step in some alternative embodiments.

The inventive algorithm, which is implemented in the audio decoder shown in FIG. 3, comprises the following steps:

1. Signal downsampling (if Nyquist criterion is not harmed)
2. Signal is windowed ("Hann" windows are proposed but other window shapes may be used) and so called grains (for example, windowed signal portions 383) of lengths N are taken from the signal. The windows are shifted over the signal with a hop size H. A N/H=8 times overlap is proposed.
3. If the grain (for example, a windowed signal portion 383) contains a transient event at the edges, it is padded (for example, by the zero padder 438) with zeros which leads to an oversampling in frequency domain.
4. Grains are transformed to frequency domain (for example, using the time-domain-to-spectral-domain transformers 400,440).
5. Frequency domain grains are (optionally) padded to a desired output length of the patching algorithm.
6. Magnitude and phase are calculated (for example, using the means 402, 404, 442, 444).
7. a) Frequency bin content n is copied to position 2n. The phase is multiplied with the 2. (a) $\zeta\cdot(s-1)/s\leq n\leq\zeta$ or (b) $\zeta/s\leq n\leq\zeta$ (see above).
7. b) Frequency bin content 2n is copied to position sn for all stretching factors s>2 in the ranges $1\leq n\leq\zeta$.
8. Frequency domain bins that get no data by the copying can be filled by applying an interpolation function (for example, using the interpolators 420,460).
9. Grains are transformed back to time domain (for example, using the inverse Fast Fourier Transformers 428,468).
10. Time domain grains are multiplied with a synthesis window (again Hann windows are proposed) (for example using the synthesis windowers 432,472).
11. If zero padding in step 3 was carried out, zeros are stripped again (for example, using the zero stripper 476).
12. Bandwidth extended signal or frame (for example, signal 392), respectively, is created using overlap and add (OLA) (for example, using overlap-and-add 390).

However, the order of the individual steps can also be exchanged in some alternative embodiments, and some of the steps can be merged into a single step in some alternative embodiments.

Thus, all steps are identical in the reference algorithm (which is implemented in the audio decoder shown in FIG. 6) and the inventive algorithm (which is implemented in the audio decoder shown in FIG. 3), except for step 7, which has been replaced by the following steps:

7.a) Frequency bin content n is copied to position 2n. The phase is multiplied with the 2. (a) $\zeta\cdot(s-1)/s\leq n\leq\zeta$ or (b) $\zeta/s\leq n\leq\zeta$ (see above).

7.b) Frequency bin content 2n is copied to position sn for all stretching factors s>2 in the ranges $1\leq n\leq\zeta$.

To summarize, the embodiments according to FIGS. 1, 2, 3 and 4 (and also the audio decoder shown in FIG. 6) firstly reduce complexity dramatically when compared to the mentioned conventional solutions. Secondly, they allow for different spectrum modifications different to either plane SBR or as presented in FIG. 5 (see, for example, Reference [13]).

For example, speech signals might benefit from the algorithm, which is performed by the apparatus, audio decoder and method according to FIGS. 1, 2, 3 and 4, as the pulse train structure, which is typical for speech signals, is better maintained than with the approach presented in Reference [13].

Most prominent applications of embodiments according to the invention are audio decoders, which are often implemented on hand-held devices and thus operate on a battery power supply.

4. Method According to FIG. 4

Figure 4:
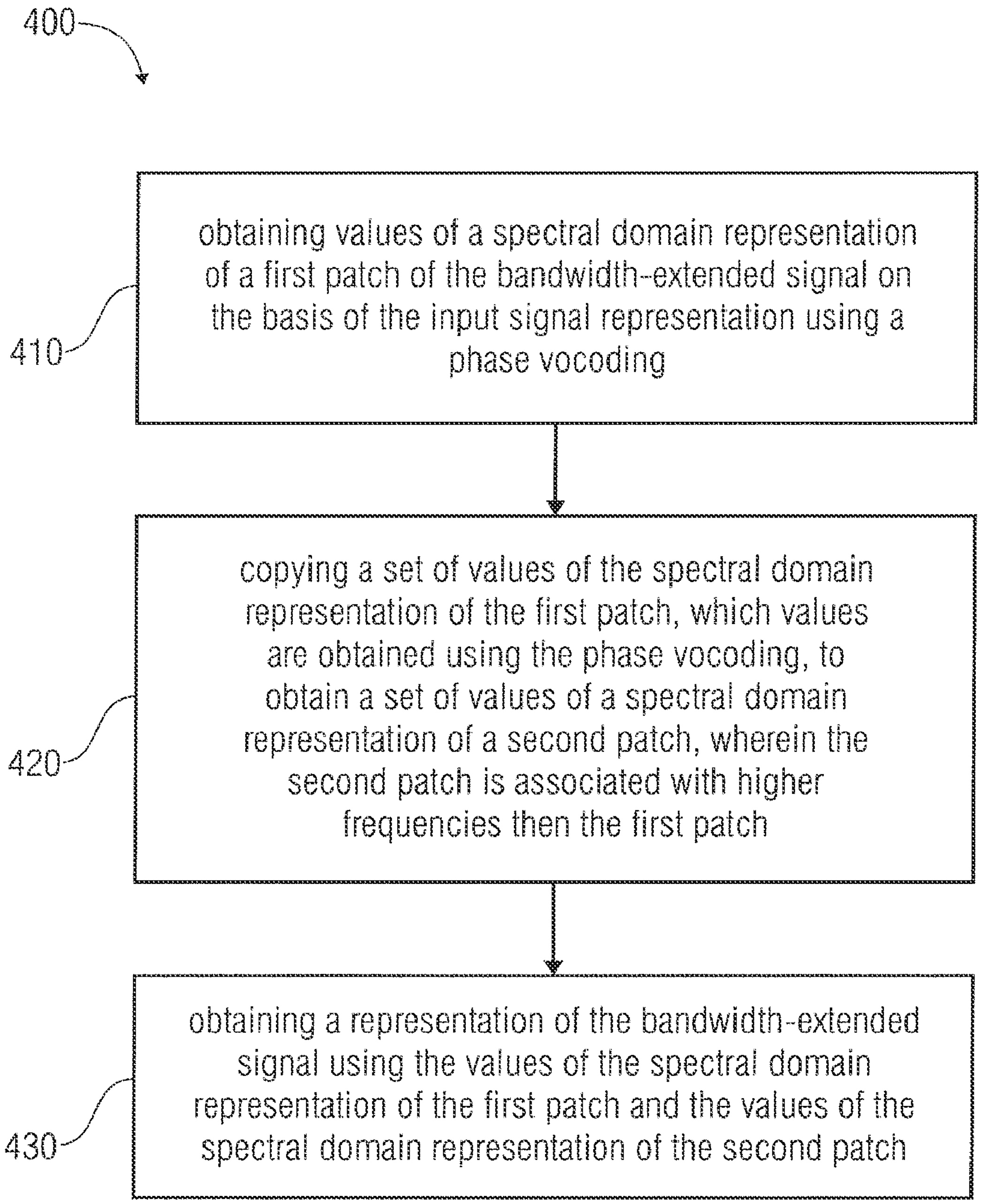
FIG. 4 shows a flowchart of a method for generating a representation of a bandwidth-extended signal on the basis of an input signal representation, according to an embodiment of the invention.

In the following, a method 400 for generating a representation of a bandwidth-extend signal on the basis of an input signal representation will be described taking reference to FIG. 4, which shows a flow chart of such a method. The method 400 comprises a step 410 of obtaining values of a spectral domain representation of a first patch of the bandwidth-extended signal on the basis of the input signal representation using a phase vocoding. The method 400 also comprises a step 420 of copying a set of values of the spectral domain representation of the first patch, which values are obtained using the phase vocoding, to obtain a set of values of a spectral domain representation of a second patch, wherein the second patch is associated with higher frequencies than the first patch. The method 400 also comprises a step 430 of obtaining a representation of the bandwidth-extended signal using the values of the spectral domain representation of the first patch and the values of the spectral domain representation of the second patch.

The method 400 can be supplemented by any of the means and functionalities discussed here with respect to the inventive apparatus.

5. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are Advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

6. Comparison Example According to FIG. 5

In the following, a comparison example will be briefly discussed taking reference to FIG. 5. The functionality of the comparison example according to FIG. 5 is similar to the function of the audio decoder according to FIG. 3, such that the means and functionalities will not be explained again. However, the comparison example according to FIG. 5 relies on the usage of three phase vocoders 590, 592, 594, or 596, 597, 598 per branch. Individual inverse Fast Fourier Transformers, synthesis windowers, overlappers-and-adders are associated to the individual phase vocoders, as can be seen in FIG. 5. Also, in some of the sub-branches, individual down-sampling (↓ factor) and individual delay ($z^{-samples}$) is used. Accordingly, the apparatus 500 according to FIG. 5 is not as computationally efficient as the apparatus 300 according to FIG. 3. Nevertheless, the apparatus 500 brings along significant improvements over some conventional audio decoders.

7. Comparison Example According to FIG. 6

FIG. 6 shows another audio decoder 600, according to a comparison example. The audio decoder 600 according to FIG. 6 is similar to the audio decoders 300, 500 according to FIGS. 3 and 5. However, the audio decoder 600 is also based on the usage of a plurality of individual phase vocoders 690, 692, 694 or 696, 697, 698 per branch, which renders the apparatus 600 computationally more demanding than the apparatus 300, and which brings along audible artifacts in some cases. Nevertheless, the apparatus 500 brings along significant improvements over some conventional audio decoders.

8. Conclusion

In view of the above discussion, it can be seen that the apparatus 100 according to FIG. 1, the audio decoder 300 according to FIG. 3 and the method 400 according to FIG. 4 bring along a number of advantages over the comparison examples, which have been briefly discussed with reference to FIGS. 5 and 6.

The inventive concept is applicable in a wide variety of applications and can be modified in a wide number of ways. In particular, the Fast Fourier Transformers can be replaced by QMF filterbanks, and the inverse Fast Fourier Transformers can be replaced by QMF synthesizers.

Also, in some embodiments some or all of the processing steps can be summarized into a single step. For example, a processing sequence comprising a QMF synthesis and a subsequent QMF Analysis may be simplified by omitting the repeated transforms.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] M. Dietz, L. Liljeryd, K. Kjörling and O. Kunz, "Spectral Band Replication, a novel approach in audio coding," in 112th AES Convention, Munich, May 2002.

[2] S. Meltzer, R. Böhm and F. Henn, "SBR enhanced audio codecs for digital broadcasting such as "Digital Radio Mondiale" (DRM)," in 112th AES Convention, Munich, May 2002.

[3] T. Ziegler, A. Ehret, P. Ekstrand and M. Lutzky, "Enhancing mp3 with SBR: Features and Capabilities of the new mp3PRO Algorithm," in 112th AES Convention, Munich, May 2002.

[4] International Standard ISO/IEC 14496-3:2001/FPDAM 1, "Bandwidth Extension," ISO/IEC, 2002. Speech bandwidth extension method and apparatus Vasu Iyengar et al.

[5] E. Larsen, R. M. Aarts, and M. Danessis. Efficient high-frequency bandwidth extension of music and speech. In AES 112th Convention, Munich, Germany, May 2002.

[6] R. M. Aarts, E. Larsen, and O. Ouweltjes. A unified approach to low- and highfrequency bandwidth extension. In AES 115th Convention, New York, USA, October 2003.

[7] K. Käyhkö. A Robust Wideband Enhancement for Narrowband Speech Signal. Research Report, Helsinki University of Technology, Laboratory of Acoustics and Audio Signal Processing, 2001.

[8] E. Larsen and R. M. Aarts. Audio Bandwidth Extension—Application to psychoacoustics, Signal Processing and Loudspeaker Design. John Wiley & Sons, Ltd, 2004.

[9] E. Larsen, R. M. Aarts, and M. Danessis. Efficient high-frequency bandwidth extension of music and speech. In AES 112th Convention, Munich, Germany, May 2002.
[10] J. Makhoul. Spectral Analysis of Speech by Linear Prediction. IEEE Transactions on Audio and Electroacoustics, AU-21(3), June 1973.
[11] U.S. patent application Ser. No. 08/951,029, Ohmori, et al. Audio band width extending system and method.
[12] U.S. Pat. No. 6,895,375, Malah, D & Cox, R. V.: System for bandwidth extension of Narrow-band speech.
[13] Frederik Nagel, Sascha Disch, "A harmonic bandwidth extension method for audio codecs," ICASSP International Conference on Acoustics, Speech and Signal Processing, IEEE CNF, Taipei, Taiwan, April 2009.

The invention claimed is:

1. An apparatus for generating a representation of a bandwidth-extended audio signal on the basis of an input audio signal representation comprising audio data, the apparatus comprising:

a patched quadrature-mirror-filterbank (QMF) data provider, which receives the audio data and which provides, on the basis thereof, patched QMF data, and a QMF synthesizer, which receives the patched QMF data and provides, on the basis thereof, an output waveform by performing a QMF synthesis;

wherein the patched QMF data provider comprises:

a device configured to acquire values of a spectral domain representation of a first patch of the bandwidth-extended audio signal on the basis of the input audio signal representation using a harmonic transposition; and a value copier configured to copy a set of values of the spectral domain representation of the first patch, which values are provided by the device, to acquire a set of values of a spectral domain representation of a second patch;

wherein the apparatus is configured to acquire the representation of the bandwidth-extended audio signal using the values of the spectral domain representation of the first patch and the values of the spectral domain representation of the second patch;

wherein the apparatus is implemented using a hardware apparatus, or using a computer, or using a combination of a hardware apparatus and a computer.

2. The apparatus according to claim 1, wherein the device is configured to copy a set of magnitude values associated with a plurality of given frequency subranges of the input audio signal representation, to acquire a set of magnitude values associated with corresponding frequency subranges of the first patch, wherein a pair of a given frequency subrange of the input audio signal representation and of a corresponding frequency subrange of the first patch cover a pair of a fundamental frequency and a harmonic of the fundamental frequency, wherein the device is configured to multiply phase values associated with the plurality of given frequency subranges of the input audio signal representation with a predetermined factor, to acquire a set of phase values associated with the corresponding frequency subranges of the first patch, and wherein the value copier is configured to copy a set of values associated with a plurality of given frequency subranges of the first patch, to acquire a set of values associated with corresponding frequency subranges of the second patch, wherein the value copier is configured to leave phase values unchanged in the copying.

3. The apparatus according to claim 2, wherein the value copier is configured to copy the values such that a common spectral shift between values of the first patch and corresponding values of the second patch is acquired.

4. The apparatus according to claim 1, wherein the device is configured to acquire the values of the spectral domain representation of the first patch such that the values of the spectral domain representation of the first patch represent a harmonically up-converted version of a fundamental frequency range of the input audio signal representation; and wherein the value copier is configured to acquire the values of the spectral domain representation of the second patch such that the values of the spectral domain representation of the second patch represent a frequency-shifted version of the audio content of the first patch.

5. The apparatus according to claim 1, wherein the apparatus is configured to receive input audio data, to down-sample the input audio data, in order to acquire down-sampled audio data, to window the down-sampled audio data, in order to acquire windowed input data, to convert or transform the windowed input data into a spectral domain, in order to acquire the input audio signal representation in the form of a spectral domain representation, to compute magnitude values $\alpha_k$ and phase values $\varphi_k$ representing a frequency bin comprising index k of the input audio signal representation, to use a plurality of magnitude values $\alpha_k$ representing frequency bins comprising frequency bin indices k of the input audio signal representation, to acquire magnitude values $\alpha_{2k}$ representing frequency bins comprising frequency bin indices sk of the first patch, when s is a stretching factor with s between 1.5 and 2.5, and to copy and scale phase values $\varphi_k$ associated to frequency bins comprising frequency bin indices k of the input audio signal representation, to acquire copied and scaled phase values $\varphi_{2k}=s\varphi_k$ associated with frequency bins comprising frequency bin indices 2k of the first patch, to copy values $\beta_{k-i\zeta}$ associated with frequency bins comprising frequency bin indices k-i$\zeta$ of the spectral domain representation of the first patch, to acquire values $\beta_k$ of the spectral domain representation of the second patch, to convert the representation of the bandwidth-extended audio signal into the time-domain, to acquire a time-domain representation, and to apply a synthesis window to the time-domain representation.

6. The apparatus according to claim 1, wherein the apparatus comprises a time-domain to spectral-domain converter configured to provide, as the input audio signal representation, values of a spectral-domain representation of an input audio signal, or of a pre-processed version of the input audio signal; and wherein the apparatus comprises a spectral-domain-to-time-domain converter configured to provide a time-domain representation of the bandwidth-extended audio signal using values of the spectral-domain representation of the first patch and values of the spectral-domain representation of the second patch;

wherein the spectral-domain-to-time-domain converter is configured such that a number of different spectral values received by the spectral-domain-to-time-domain converter is larger than a number of different spectral values provided by the time-domain-to-spectral-domain converter, such that the spectral-domain-to-time-domain converter is configured to process a larger number of frequency bins than the time-domain-to-spectral-domain converter.

7. The apparatus according to claim 1, wherein the apparatus comprises an analysis windower configured to window a time-domain input audio signal, to acquire a windowed version of the time-domain input audio signal, which forms the basis for acquiring the input audio signal representation in the form of a spectral domain representation; and wherein the apparatus comprises a synthesis windower configured to window a portion of a time-domain representation of the bandwidth-extended audio signal, to acquire a windowed portion of the time-domain representation of the bandwidth-extended audio signal.

8. The apparatus according to claim 7, wherein the apparatus is configured to process a plurality of temporally overlapping time-shifted portions of the time-domain input audio signal, to acquire a plurality of temporally overlapping time-shifted windowed portions of the time-domain representation of the bandwidth-extended audio signal, wherein a time offset between temporally adjacent time-shifted portions of the time-domain input audio signal is smaller than or equal to one fourth of a window length of the analysis windower.

9. The apparatus according to claim 1, wherein the apparatus comprises a transient information provider configured to provide an information indicating the presence of a transient in the input audio signal; and wherein the apparatus comprises a first processing branch for providing a representation of a bandwidth-extended audio signal portion on the basis of a non-transient portion of the input audio signal representation and a second processing branch for providing a representation of a bandwidth-extended audio signal portion on the basis of a transient portion of the input audio signal representation;

wherein the second processing branch is configured to process a spectral-domain representation of the input audio signal comprising a higher spectral resolution than a spectral-domain representation of the input audio signal processed by the first processing branch.

10. The apparatus according to claim 9, wherein the second processing branch comprises a time-domain zero-padder configured to zero-pad a transient-comprising portion of the input audio signal, in order to acquire a temporally extended transient-comprising portion of the input audio signal; and wherein the first processing branch comprises a time-domain-to-frequency-domain converter configured to provide a first number of spectral-domain values associated with the non-transient portion of the input audio signal; and wherein the second processing branch comprises a time-domain-to-frequency-domain converter configured to provide a second number of spectral-domain values associated with the temporally extended transient-comprising portion of the input audio signal, wherein the second number of spectral domain values is larger, at least by a factor of 1.5, than the first number of spectral-domain values.

11. The apparatus according to claim 10, wherein the second processing branch comprises a zero stripper configured to remove a plurality of zero values from a bandwidth-extended audio signal portion acquired on the basis of the temporally extended transient-comprising portion of the input audio signal.

12. The apparatus according to claim 1, wherein the apparatus comprises a down-sampler configured to down-sample a time-domain representation of the input audio signal audio signal.

13. An audio decoder comprising an apparatus for generating a representation of a bandwidth-extended audio signal on the basis of an input audio signal representation comprising audio data, the apparatus comprising:

a patched quadrature-mirror-filterbank (QMF) data provider, which receives the audio data and which provides, on the basis thereof, patched QMF data, and a QMF synthesizer, which receives the patched QMF data and provides, on the basis thereof, an output waveform by performing a QMF synthesis;

wherein the patched QMF data provider comprises:

a device configured to acquire values of a spectral domain representation of a first patch of the bandwidth-extended audio signal on the basis of the input audio signal representation using a harmonic transposition; and a value copier configured to copy a set of values of the spectral domain representation of the first patch, which values are provided by the device, to acquire a set of values of a spectral domain representation of a second patch;

wherein the apparatus is configured to acquire the representation of the bandwidth-extended audio signal using the values of the spectral domain representation of the first patch and the values of the spectral domain representation of the second patch;

wherein the audio decoder is implemented using a hardware apparatus, or using a computer, or using a combination of a hardware apparatus and a computer.

14. A method for generating a representation of a bandwidth-extended audio signal on the basis of an input audio signal representation comprising audio data, the method comprising:

receiving the audio data and providing, on the basis thereof, patched quadrature-mirror-filterbank (QMF) data, and providing, on the basis of the patched QMF data, an output waveform by performing a QMF synthesis;

wherein providing the patched QMF data comprises:

acquiring, using a harmonic transposition, values of a spectral-domain representation of a first patch of the bandwidth-extended audio signal on the basis of the input audio signal representation; and copying a set of values of the spectral-domain representation of the first patch, which values are provided by the harmonic transposition, to acquire a set of values of a spectral-domain representation of a second patch; and wherein the representation of the bandwidth-extended audio signal is acquired using the values of the spectral-domain representation of the first patch and the values of the spectral-domain representation of the second patch.

15. An apparatus for generating a representation of a bandwidth-extended audio signal on the basis of an input audio signal representation comprising audio data, the apparatus comprising:

a patched QMF data provider, which receives the audio data and which provides, on the basis thereof, patched QMF data, and a QMF synthesizer, which receives the patched QMF data and provides, on the basis thereof, an output waveform by performing a QMF synthesis;

wherein the patched QMF data provider comprises:

a value copier configured to copy a set of values of the input audio signal representation, to acquire a set of values of a spectral domain representation of a first patch, wherein the first patch is associated with higher frequencies than the input audio signal representation; and a device configured to acquire values of a spectral domain representation of a second patch of the bandwidth-extended audio signal on the basis of the values of the spectral domain representation of the first patch using a harmonic transposition; and w wherein the apparatus is configured to acquire the representation of the bandwidth-extended audio signal using the values of the spectral domain representation of the first patch and the values of the spectral domain representation of the second patch;

wherein the apparatus is implemented using a hardware apparatus, or using a computer, or using a combination of a hardware apparatus and a computer.

16. A method for generating a representation of a bandwidth-extended audio signal on the basis of an input audio signal representation comprising audio data, the method comprising:

receiving the audio data and providing, on the basis thereof, patched quadrature-mirror-filterbank (QMF) data, and providing, on the basis of the patched QMF data, an output waveform by performing a QMF synthesis;

wherein providing the patched QMF data comprises:

copying values of the input audio signal representation, to acquire values of a spectral-domain representation of a first patch of the bandwidth-extended audio signal on the basis of the input audio signal representation, wherein the first patch is associated with higher frequencies than the input audio signal representation, and acquiring, using a harmonic transposition, a set of values of the spectral-domain representation of the second patch on the basis of a set of values of the spectral-domain representation of the first patch, which values of the spectral domain representation of the first patch are acquired by the copying; and wherein the representation of the bandwidth-extended audio signal is acquired using the values of the spectral-domain representation of the first patch and the values of the spectral-domain representation of the second patch.

17. A method for generating a representation of a bandwidth-extended audio signal on the basis of an input audio signal representation comprising audio data, the method comprising:

receiving the audio data and providing, on the basis thereof, patched quadrature-mirror-filterbank (QMF) data, and providing, on the basis of the patched QMF data, an output waveform by performing a QMF synthesis;

wherein providing the patched QMF data comprises:

acquiring, using a harmonic transposition, values of a spectral-domain representation of a first patch of the bandwidth-extended audio signal on the basis of the input audio signal representation, and copying a set of values of the spectral-domain representation of the first patch, which values are provided by the harmonic transposition, to acquire a set of values of a spectral-domain representation of a second patch; and herein the representation of the bandwidth-extended audio signal is acquired using the values of the spectral-domain representation of the first patch and the values of the spectral-domain representation of the second patch.

18. A method for generating a representation of a bandwidth-extended audio signal on the basis of an input audio signal representation comprising audio data, the method comprising:

receiving the audio data and providing, on the basis thereof, patched quadrature-mirror-filterbank (QMF) data, and providing, on the basis of the patched QMF data, an output waveform by performing a QMF synthesis;

wherein providing the patched QMF data comprises:

copying values of the input audio signal representation, to acquire values of a spectral-domain representation of a first patch of the bandwidth-extended audio signal on the basis of the input audio signal representation, wherein the first patch is associated with higher frequencies than the input audio signal representation, and acquiring, using a harmonic transposition, a set of values of the spectral-domain representation of the second patch on the basis of a set of values of the spectral-domain representation of the first patch, which values of the spectral domain representation of the first patch are acquired by the copying; and wherein the representation of the bandwidth-extended audio signal is acquired using the values of the spectral-domain representation of the first patch and the values of the spectral-domain representation of the second patch.

19. An apparatus for generating a representation of a bandwidth-extended audio signal on the basis of an input audio signal representation comprising audio data, the apparatus comprising:

a patched quadrature-mirror-filterbank (QMF) data provider, which receives the audio data and which provides, on the basis thereof, patched QMF data, and a QMF synthesizer, which receives the patched QMF data and provides, on the basis thereof, an output waveform by performing a QMF synthesis;

wherein the patched QMF data provider comprises a device configured to acquire frequency transposed values associated with a first patch of the bandwidth-extended audio signal on the basis of the input audio signal representation;

wherein the apparatus is configured to obtain values of a spectral domain representation of a second patch, using the frequency transposed values associated with the first patch;

wherein the apparatus is configured to acquire the representation of the bandwidth-extended audio signal using values of a spectral domain representation of the first patch and the values of the spectral domain representation of the second patch;

wherein the apparatus is implemented using a hardware apparatus, or using a computer, or using a combination of a hardware apparatus and a computer.

20. An apparatus for generating a representation of a bandwidth-extended audio on the basis of an input audio signal representation comprising audio data, the apparatus comprising:

a patched quadrature-mirror-filterbank (QMF) data provider, which receives the audio data and which provides, on the basis thereof, patched QMF data, and a QMF synthesizer, which receives the patched QMF data and provides, on the basis thereof, an output waveform by performing a QMF synthesis;

wherein the patched QMF data provider comprises a device configured to acquire frequency transposed values associated with a first patch of the bandwidth-extended audio signal on the basis of the input audio signal representation;

wherein the apparatus is configured to obtain values of a spectral domain representation of a second patch, wherein the second patch is associated with higher frequencies than the first patch, using the frequency transposed values associated with the first patch;

wherein the apparatus is configured to acquire the representation of the bandwidth-extended audio signal using values of a spectral domain representation of the first patch and the values of the spectral domain representation of the second patch;

wherein the apparatus is implemented using a hardware apparatus, or using a computer, or using a combination of a hardware apparatus and a computer.

21. An apparatus for generating a representation of a bandwidth-extended audio signal on the basis of an input audio signal representation comprising audio data, the apparatus comprising:

a patched quadrature-mirror-filterbank (QMF) data provider, which receives the audio data and which provides, on the basis thereof, patched QMF data, and a QMF synthesizer, which receives the patched QMF data and provides, on the basis thereof, an output waveform by performing a QMF synthesis;

wherein the patched QMF data provider comprises a device configured to acquire frequency transposed values associated with a first patch of the bandwidth-extended audio signal on the basis of the input audio signal representation using a harmonic transposition;

wherein the apparatus is configured to obtain values of a spectral domain representation of a second patch, wherein the second patch is associated with higher frequencies than the first patch, using copies of the frequency transposed values associated with the first patch;

wherein the apparatus is configured to acquire the representation of the bandwidth-extended audio signal using values of a spectral domain representation of the first patch and the values of the spectral domain representation of the second patch;

wherein the apparatus is implemented using a hardware apparatus, or using a computer, or using a combination of a hardware apparatus and a computer.

* * * * *